US005574374A

United States Patent [19]
Thompson et al.

[11] Patent Number: 5,574,374
[45] Date of Patent: *Nov. 12, 1996

[54] METHOD AND APPARATUS FOR INTERROGATING A BOREHOLE AND SURROUNDING FORMATION UTILIZING DIGITALLY CONTROLLED OSCILLATORS

[75] Inventors: Larry W. Thompson, Willis; Macmillan M. Wisler, Kingwood, both of Tex.

[73] Assignee: Baker Hughes Incorporated, Houston, Tex.

[*] Notice: the term of this patent shall not extend beyond the expiration date of Pat. No. 5,081,419.

[21] Appl. No.: 214,343

[22] Filed: Mar. 14, 1994

Related U.S. Application Data

[63] Continuation-in-part of Ser. No. 820,091, Jan. 13, 1992, Pat. No. 5,402,068, which is a continuation of Ser. No. 697,524, Apr. 29, 1991, Pat. No. 5,081,419.

[51] Int. Cl.$^6$ ............................ G01V 3/08; G01V 1/02
[52] U.S. Cl. ............................ 324/338; 364/422
[58] Field of Search ............................ 324/332–344, 324/356, 369; 364/422, 579, 580

[56] References Cited

U.S. PATENT DOCUMENTS

| | | | |
|---|---|---|---|
| 3,891,916 | 6/1975 | Meador et al. | 324/6 |
| 4,739,325 | 4/1988 | MacLeod | 324/342 X |
| 4,916,400 | 4/1990 | Best et al. | 324/338 |
| 4,940,943 | 7/1990 | Bartel et al. | 324/338 |
| 4,964,085 | 10/1990 | Coope et al. | 324/338 X |
| 5,081,419 | 1/1992 | Meador et al. | 324/338 |
| 5,083,124 | 1/1992 | Nordstrom | 324/344 X |
| 5,187,661 | 2/1993 | Sinclair | 324/339 X |
| 5,233,522 | 8/1993 | Sinclair | 324/339 X |

FOREIGN PATENT DOCUMENTS

84/01439  4/1984  European Pat. Off. .

Primary Examiner—Sandra L. O'Shea
Assistant Examiner—Roger Phillips
Attorney, Agent, or Firm—Melvin A. Hunn; Felsman, Bradley, Gunter & Dillon

[57] ABSTRACT

The present invention is directed to a measurement-while-drilling logging tool which includes a minimum number of analog electrical and electronic components, and which instead utilizes digitally-controlled electronic and electrical components to obtain an accuracy which is not possible utilizing prior art measurement-while-drilling logging tools. Additionally, the present invention allows for calibration operations to be conducted before, during, and after logging operations. Preferably, the calibration operations are performed periodically or intermittently during logging operations, and recorded, to be utilized later in explaining any irregularities in the log data. This calibration operation during drilling operations is not found in prior art devices, and is rendered practical by the utilization of digitally-controlled electrical and electronic components in lieu of analog components which are traditionally utilized in logging tools. The logging tool of the present invention also allows for the periodic calculation of the undesirable magnetic field mutual coupling between particular receiving antennas. Once the value of the magnetic mutual coupling is calculated, it may be recorded for future use, or automatically subtracted from particular measurements, greatly enhancing the accuracy of logging operations. Finally, the measurement-while-drilling logging tool of the present invention can perform for the first time accurate borehole calipering operations, due in large part to the great accuracy associated with the particular components selected of the preferred embodiment of the present invention.

58 Claims, 24 Drawing Sheets

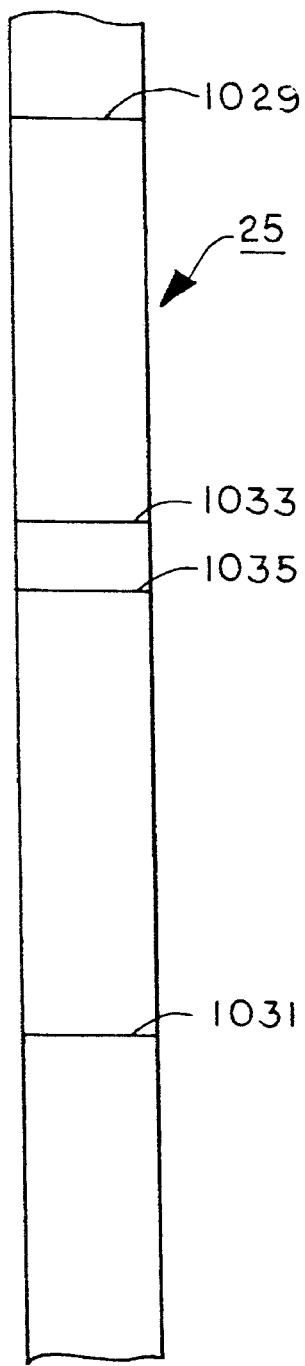
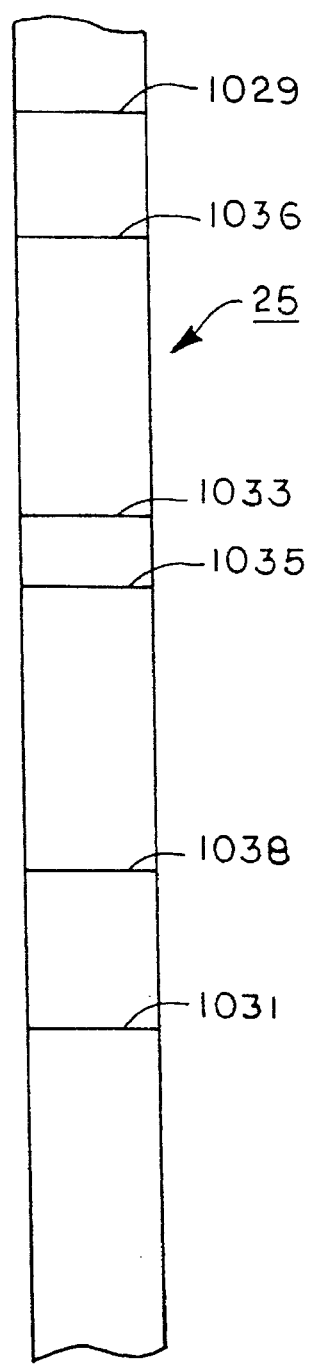
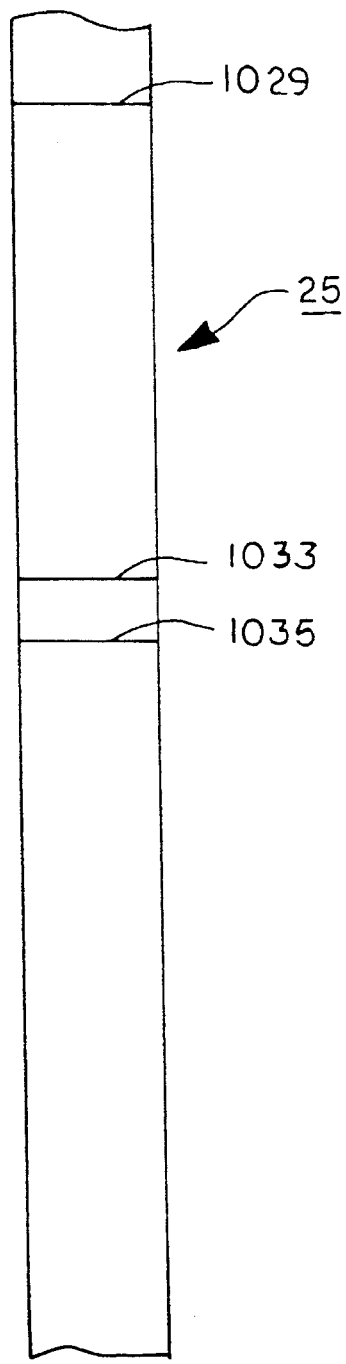
FIG. IB     FIG. IC     FIG. ID (INCIDENT SIGNAL)

(REFLECTED SIGNAL)

(INCIDENT SIGNAL)

(REFLECTED SIGNAL)

Borehold Diameter and Formation Resistivity vs Attenuation and Phase between receivers 8 inches apart for a mud resistivity of .05 Ω·m.

METHOD AND APPARATUS FOR INTERROGATING A BOREHOLE AND SURROUNDING FORMATION UTILIZING DIGITALLY CONTROLLED OSCILLATORS

RELATED U.S. APPLICATION DATA

This application is a continuation-in-part of U.S. patent application Ser. No. 07/820,091, now U.S. Pat. No. 5,402,068, which is entitled "High Sensitivity Well Logging System Having Dual Transmitter Antennas and Intermediate Series Resonant Receiving Antennas", which was filed Jan. 13, 1992, which is a continuation of U.S. patent application Ser. No. 07/699,524, now U.S. Pat. No. 5,081,419 which was filed Apr. 29, 1991, and which is incorporated herein by reference.

BACKGROUND OF THE INVENTION

1. Field of the Invention

The present invention relates in general to wellbore measurement tools, and in particular to logging tools for use in interrogating wellbores and surrounding formations.

2. Description of the Prior Art

As the oil and gas industry increasingly relies upon measurement-while-drilling logging operations as a full substitute for wireline logging operations, the accuracy and reliability of the measurement-while-drilling logging instruments become vital in ensuring the future of measurement-while drilling operations as a viable alternative. At present, the service-providers have a difficult time in explaining irregularities in the log data which may be due to factors other than miscalibration or malfunctioning of the logging instrument, but which can nonetheless not be easily explained. The service-recipient only sees that a block of data is somehow impaired or otherwise suboptimal, and typically wants to assess responsibility to a particular contractor or subcontractor. Generally, the service-provider is hard pressed to dispositively address these issues, and thus cannot typically repute allegations concerning log quality. Several particular sources of error are addressed by the present invention, including calibration, thermal drift, caliber operations, and mutual coupling.

In prior art systems, logging instruments are typically calibrated at the well site (or in the laboratory) during an air-hang calibration operation, during which the transmitter and receiver antennas of the logging tool are utilized to transmit and receive electromagnetic signals which propagate through the atmosphere around the tool. These air-hang calibration operations provide no data whatsoever about the operation of the tool once it is run into the wellbore and operated in the wellbore environment. Calibration values obtained during the air-hang may not apply for the wellbore environment, or the measurement-while-drilling logging tool may go out of calibration once it is run into the wellbore.

Prior art measurement-while-drilling logging instruments typically include a considerable number of analog electrical and electronic components in both the transmitting and receiving circuits, which tend to introduce an error component when subjected to changes in temperature. This type of error component is typically identified as a "thermal drift" error component. In prior art devices, this thermal drift error component introduces substantial inaccuracies in measurements, which can reduce the overall accuracy of the logging tool.

Many prior art measurement-while-drilling logging tools claim to be able to provide some indication of the size and shape of the borehole, during operations which are generally characterized as "calipering" operations. Such calipering operations depend upon the ability to detect slight changes in the amplitude attenuation or phase shift in the logging measurements which is attributable to changes in the borehole size. A variety of factors are taken into account during calipering operations, including the diameter of the logging tool, the resistivity of the drilling mud, the diameter of invasion of the drilling mud into the formation, the resistivity of the formation and drilling mud in the invaded zone, and the resistivity of the formation for uninvaded portions of the formation. Calibration errors and thermal drift error components, along with the other inaccuracies inherent in utilizing such a large number of variables typically dwarf the changes in resistivity of the borehole, and render prior art borehole calipering operations techniques essentially meaningless.

Another problem typically encountered during logging operations is undesirable magnetic field mutual coupling which may occur between two or more receiving antennas. Viewed broadly, the magnetic mutual coupling between receivers can be considered a loss of information attributable to the magnetic interaction of the receivers, and which can be considered to be an error component. More particularly, mutual coupling arises when a propagating electromagnetic field generates a current in a particular receiver, and the current which is generated in a particular receiver itself generates a propagating electromagnetic field which is combined with the interrogating electromagnetic field to influence the amount of current generated in one or more adjacent receiving antennas.

In summary, some of the principal technical problems associated with measurement-while-drilling logging tools include: (1) the inability to obtain a meaningful and accurate calibration, (2) the difficulty of obtaining the calibration, (3) the inability to determine when a tool goes out of calibration during logging operations, (4) the considerable impact on accuracy of thermal drift error components, (5) the inability to obtain accurate borehole caliber data utilizing a logging tool, principally due to the combined effect of error components associated with the variables utilized to derive borehole caliper data, and (6) the effects of undesired magnetic field mutual coupling between receiving antenna in a logging apparatus.

In the long run, in order for measurement-while-drilling logging tools to be a full substitute for wireline tools, the industry must resolve these and other problems which diminish the accuracy of the logs derived by measurement-while-drilling logging tools.

SUMMARY OF THE INVENTION

It is one objective of the present invention to provide a measurement-while-drilling logging tool which includes a minimum number of analog electrical and electronic components, and which instead maximizes the use of digital components which are not as susceptible to the adverse impact in accuracy which is largely due to thermal drift error components. In particular, in the preferred embodiment of the present invention, a plurality of digital processors are provided within the measurement-while-drilling logging tool, which are dedicated for particular purposes. Therefore, the various principal components of the measurement-while-drilling tool communicate with one another through data buses with digital commands.

It is yet another objective of the present invention to provide a measurement-while-drilling logging tool which is capable of improved calibration operations, which allows for the calibration of the logging tool either before, during, or after logging operations. The ability to conduct calibration operations during logging operations allows for the creation of a continuous record of the operating condition of the logging tool. This greatly increases the service-provider's ability to explain irregular logs to a customer. The calibration condition of the logging tool can be known at a plurality of time intervals throughout the logging operations; therefore, if the measurement-while-drilling logging tool is responsible for a particular irregularity in the log, this responsibility should be reflected in the calibration data. In other words, a tool that is fully within calibration would not easily provide erroneous logs. This allows the service-provider to help the customer to pinpoint the source of the error in systems or subsystems which operated in conjunction with the measurement-while-drilling logging tool during drilling operations. In accordance with the present invention, the calibration operations are performed utilizing digitally-controlled components, and thus provide a precise quantative and qualitative measure of the calibration condition of the measurement-while-drilling logging tool.

It is yet another objective of the present invention to provide a measurement-while-drilling logging tool which allows for the periodic or intermittent calculation of the magnetic field mutual coupling between the particular receiving antennas, in order to allow for the "normalization" of logging data by the automatic and mathematical elimination of the adverse effect of the undesirable magnetic field mutual coupling between particular receiving antennas. The digitally-controlled electrical and electronic components included in the preferred embodiment of the present invention allow for very precise measurement of the magnetic field mutual coupling and thus allow for reduction of the error component attributable to the undesirable magnetic field mutual coupling to a very large extent.

It is yet another objective of the present invention to provide a measurement-while-drilling logging tool which for the first time allows for the accurate measurement of borehole size during borehole caliper operations. The ability to accurately calculate borehole size is in large part due to the precision which is present in the preferred embodiment of the present invention which is due largely to the utilization of digitally-controlled electrical and electronic components.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 1B, 1C, and 1D provide schematic views of possible antenna configurations;

DETAILED DESCRIPTION OF THE INVENTION

Figure 1A:
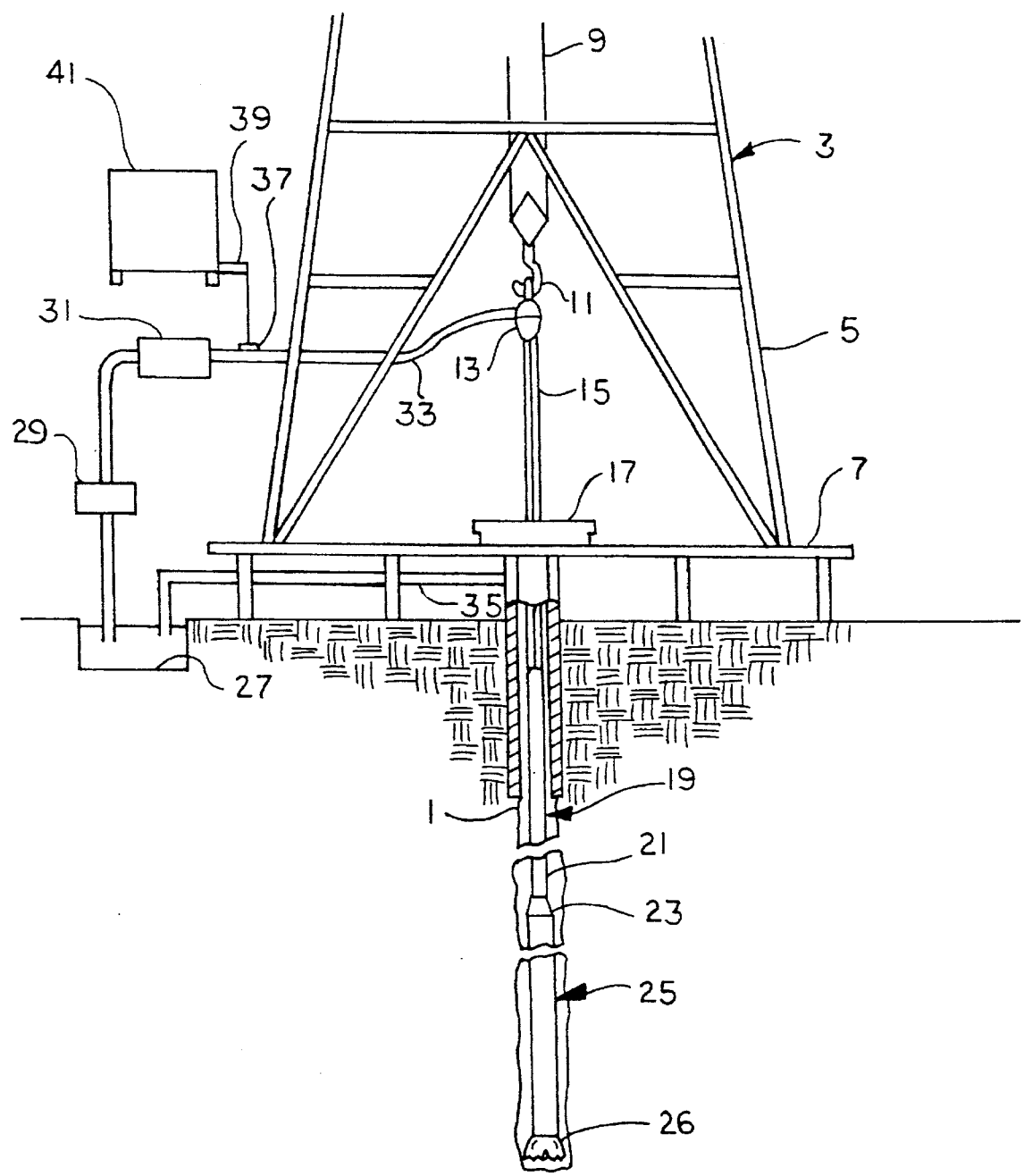
FIG. 1A provides a simplified perspective view and partial longitudinal section view of a measurement-while-drilling system utilized during drilling operations.

1. OVERVIEW OF MEASUREMENT-WHILE-DRILLING: With reference to FIG. 1a, there will now be described an overall simultaneous drilling and logging system that incorporates an electromagnetic wave propagation resistivity measurement system according to this invention.

A well 1 is being drilled into the earth under control of surface equipment including a rotary drilling rig 3. In accord with a conventional arrangement, rig 3 includes a derrick 5, derrick floor 7, draw works 9, hook 11, swivel 13, kelly joint 15, rotary table 17, and drill string 19 that includes drill pipe 21 secured to the lower end of kelly joint 15 and to the upper end of a section of drill collars including an upper drill collar 23, an intermediate drill collar or sub (not separately shown), and a lower drill collar measurement tubular 25 immediately below the intermediate sub. A drill bit 26 is carried by the lower end of measurement tubular 25.

Drilling fluid (or "mud," as it is commonly called) is circulated from a mud pit 27 through a mud pump 29, past a desurger 31, through a mud supply line 33, and into swivel 13. The drilling mud flows down through the kelly joint and an axial central bore in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 35. A shaker screen (not shown) separates formation cuttings from the drilling mud before it returns to the mud pit.

The overall system of FIG. 1 uses mud pulse telemetry techniques to communicate data from downhole to the surface while drilling operations takes place. To receive data at the surface, there is a transducer 37 in mud supply line 33. This transducer generates electrical signals in response to drilling mud pressure variations, and these electrical signals are transmitted by a surface conductor 39 to a surface electronic processing system 41.

As explained in U.S. Pat. No. 4,216,536 to More, which is incorporated herein by reference as if fully set forth, mud pulse telemetry techniques provide for communicating data to the surface about numerous downhole conditions sensed by well logging transducers or measurement systems that ordinarily are located on and within the drill collar nearest the drill bit. The mud pulses that define the data propagated to the surface are produced by equipment within the intermediate sub. Such equipment suitably comprises a pressure pulse generator operating under control of electronics contained within an instrument housing to allow drilling mud to vent through an orifice extending through the logging collar wall. Each time the pressure pulse generator causes such venting, a negative pressure pulse is transmitted to be received by surface transducer 37. An alternative conventional arrangement generates and transmits positive pressure pulses.

The circulating drilling mud provides a source of energy for a turbine-driven generator sub-assembly located in the intermediate sub, and the turbine-driven generator sub-assembly generates electrical power for the pressure pulse generator and for various circuits including circuits forming part of the preferred embodiment of this invention. As an alternative or supplemental source of electrical power, batteries may be provided, particularly as a back-up for the turbine-driven generator.

A measurement system embodying this invention includes electronics contained in electronics housings contained within measurement tubular 25, and contains elements arranged in recesses or "necked-down" portions of the tubular steel housing of measurement tubular 25. Some of these elements of measurement tubular 25 include upper transmitting antenna, lower transmitting antenna, and intermediate receiving antennas which are carried about an exterior surface of measurement tubular 25, and which are utilized to interrogate the borehole and surrounding formation, as will be discussed in greater detail herebelow.

2. POSSIBLE ANTENNA CONFIGURATIONS: FIGS. 1b, 1c, and 1d depict in simplified schematic form several possible antenna configurations which can be utilized in accordance with the teachings of the present invention. The antenna configuration of FIG. 1b is a dual transmitter, dual receiver antenna configuration which includes upper transmitting antenna 1029 located at an upper portion of measurement tubular 25, lower transmitting antenna 1031, which is located at a lower portion of measurement tubular 25, and intermediate receiving antennas 1033, 1035. FIG. 1c depicts another antenna configuration in accordance with the present invention and includes upper transmitting antennas 1029, 1036 which are located at an upper portion of measurement tubular 25, lower transmitting antennas 1031, 1038 which are located at a lower portion of measurement tubular 25, and intermediate receiving antennas 1033, 1035. Yet another configuration which is possible in accordance with the present invention is depicted in FIG. 1d. This configuration includes only a single transmitting antenna, such as upper transmitting antenna 1029, and two or more receiving antennas 1033, 1035. This configuration is commercially practical as a direct result of the teachings of the present invention, as will be discussed in greater detail herebelow.

Figure 2A:
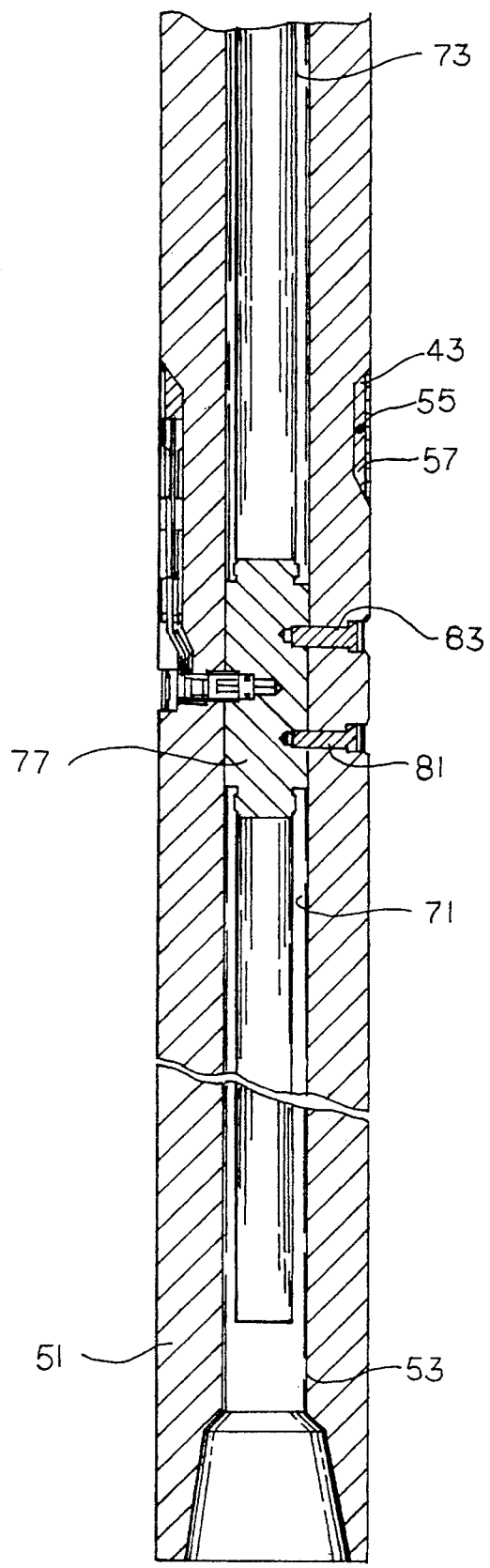
FIGS. 2A and 2B provide a longitudinal section view of a dual transmitter, dual receiver logging-while-drilling tool, and in particular depicts antenna construction.
Figure 2B:
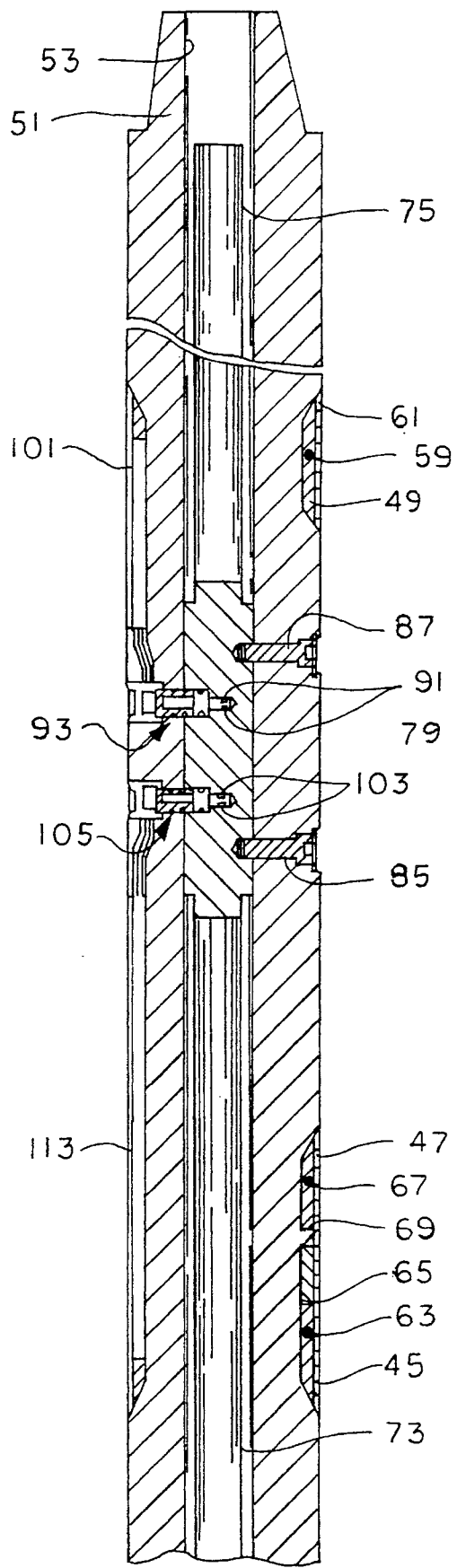

3. ANTENNA CONSTRUCTION: FIGS. 2a and 2b provide a longitudinal section view of measurement tubular 25 for a dual transmitter, dual receiver logging apparatus.

A tubular steel housing 51 is provided. A conductor 55 is part of a first transmitting antenna assembly which is encapsulated in antenna-insulating sleeve 43 that surrounds a circumferential recess 57 in tubular steel housing 51. A conductor 59 is part of a second transmitting antenna assembly which is encapsulated in antenna-insulating sleeve 49 that surrounds a circumferential recess 61 in tubular steel housing 51. A conductor 63 is part of a first receiving antenna assembly which is encapsulated in antenna-insulating sleeve 45 that surrounds a circumferential recess 65 in tubular steel housing 51. A conductor 67 is part of a second receiving antenna assembly which is encapsulated in antenna-insulating sleeve 47 that surrounds a circumferential recess 69 in tubular steel housing 51.

The ring-shaped portion of the collar that separates recess 65 from recess 69 provides for de-coupling between the first and the second receiving antenna assemblies. An alternative arrangement involves a single recess for both the first and second receiving antenna assemblies. In the alternative arrangement, the receiving antenna assemblies can be spaced closer together.

Each antenna-insulating sleeve is made of multiple layers including an outer layer of nitrile rubber, a material which is sufficiently durable to protect the encapsulated antenna coil from wear despite the adverse conditions involved in a drilling operation, and provides adequate electrical insulation despite the hydrostatic pressures involved in the drilling operation. A suitable way to make each sleeve involves several steps including wrapping around the recess a durable fiberglass of the type that is used in replaceable insulating sleeves for MWD subs. Then, portions of the fiberglass wrappings are cut away to provide circumferential and longitudinal grooves for conductors of the antenna assembly and to provide a recess for a junction box. After insertion of the components of the antenna assembly, the nitrile rubber is applied.

Preferably, in a dual-transmitter, dual receiver tool, the axial spacing from conductor 55 of the first transmitting antenna assembly to conductor 63 of the first receiving antenna assembly is 28 inches, from conductor 63 to conductor 67 of the second receiving antenna assembly is 6 to 10 inches, and from conductor 67 to conductor 59 of the second transmitting antenna assembly is 28 inches. In the above-mentioned alternative arrangement in which both receiving antenna assemblies are in a single recess, the spacings suitably are 30 inches, 6 inches, and 30 inches. Close spacing of receiving antennas provides good vertical resolution which allows thin beds in the formation to be identified; however, the closer the spacing on receiving antennas the greater the impact of magnetic mutual coupling. The present invention includes a technique for eliminating the error component associated with the error component associated with magnetic coupling, thus allowing close spacing of receiving antennas, and better vertical resolution than could be obtained from prior art devices.

Within steel housing 51, there are arranged three pressure-sealed electronics housings 71, 73, and 75, together with supporting blocks 77 and 79. Each supporting block engages the interior cylindrical surface of tubular steel housing 51. Supporting blocks 77 and 79 are fixed in place by sealed anchor bolts 81, 83, 85, and 87.

Figure 3:
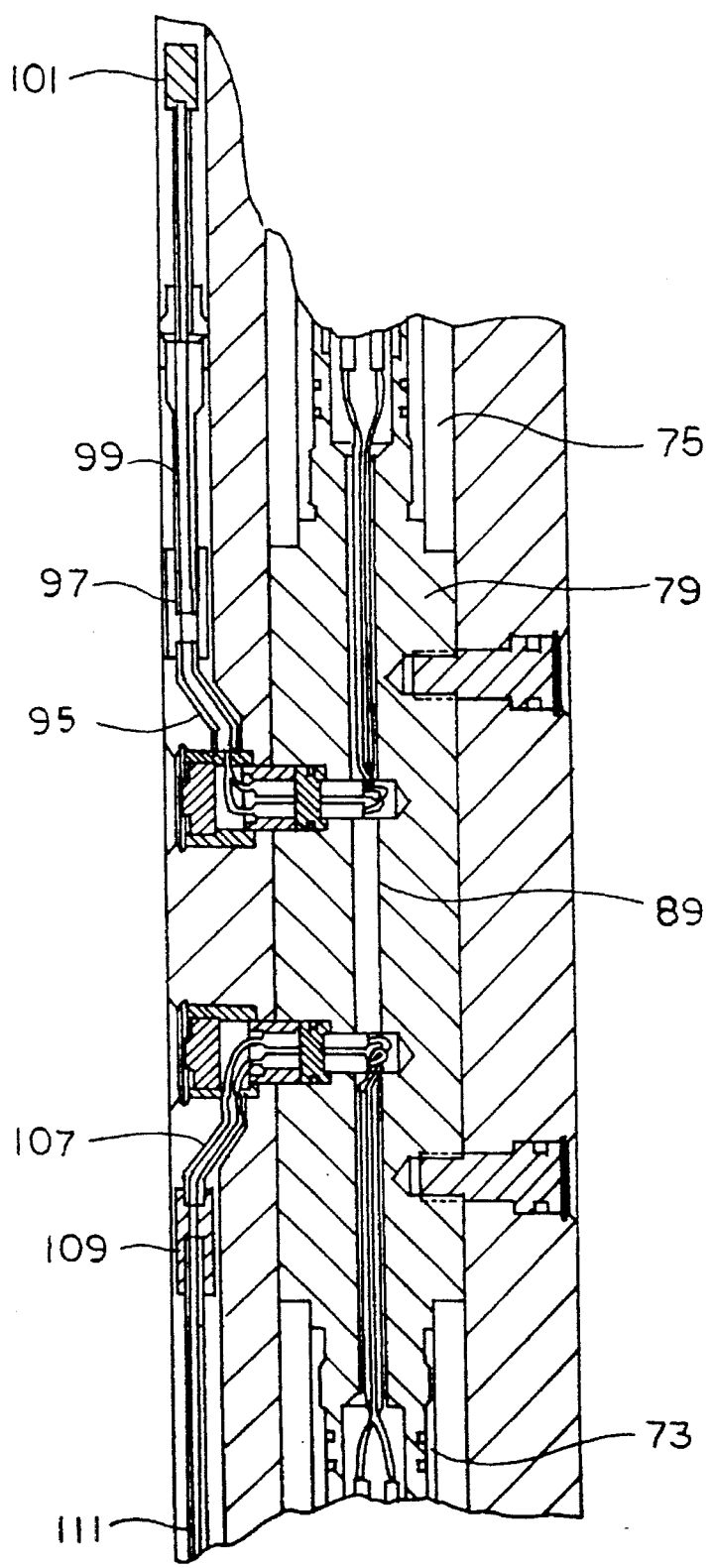
FIG. 3 provides a detail view of a portion of the antenna construction of FIGS. 2A and 2B.

As shown in the enlarged view of FIG. 3, supporting block 79 has an axial bore 89 that serves as section of a conduit assembly for conductors that extend from circuitry in electronic housings 73 and 75. Axial bore 89 communicates with openings 91 (FIG. 2B) in a pressure-sealed, generally radially-extending port connector assembly 93 that serves as a section of the conduit assembly for conductors that interconnect circuitry within electronics housings 75 and the second transmitting antenna assembly. Other sections of this conduit assembly are a port tube 95, a tubing length adjuster 97, and tubing 99 that terminates in a junction box 101.

Axial bore 89 also communicates with openings 103 (FIG. 2B) in another pressure-sealed, generally radially-extending port connector assembly 105 that serves as a section of the conduit assembly for conductors that interconnect circuitry in electronics housings 73 and the first and second receiving antenna assemblies. Other sections of this conduit assembly are a port tube 107, a tubing length adjuster 109, and tubing 111 that terminates in a junction box 113.

Figure 4:
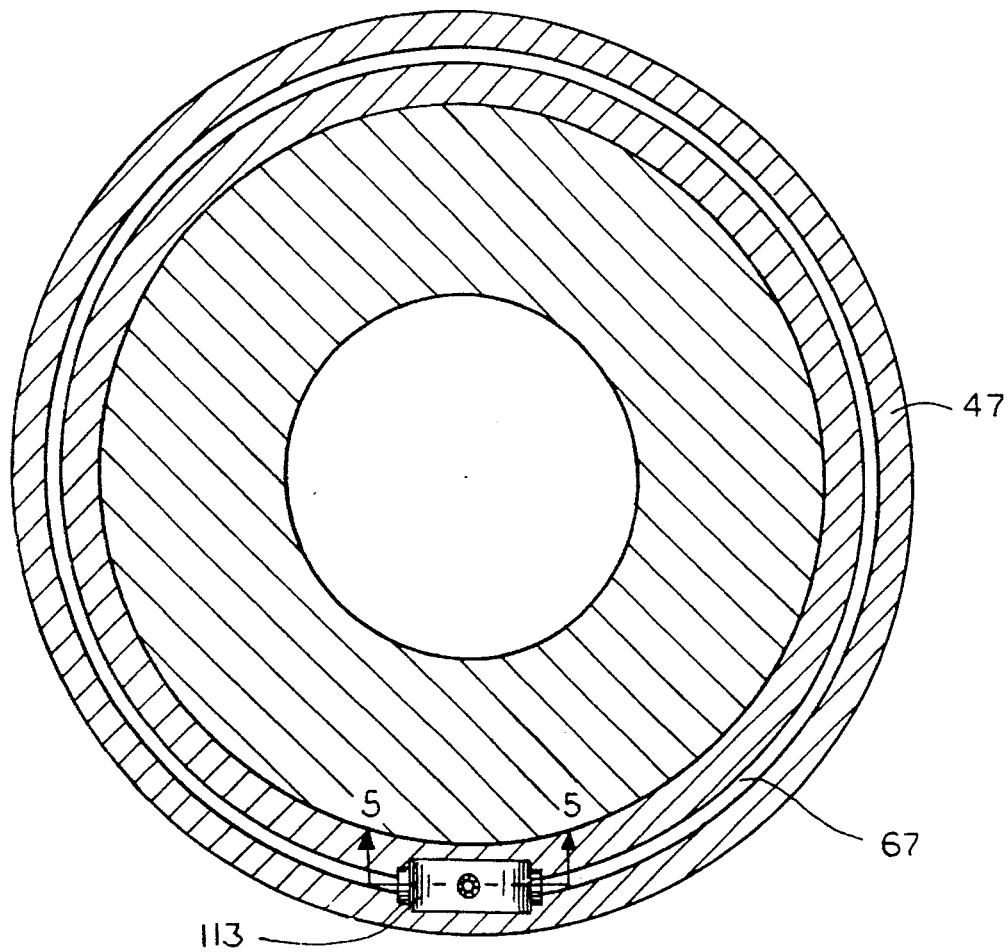
FIG. 4 is a cross-section view of the antenna construction of FIGS. 2A, 2B, and 3.
Figure 5:
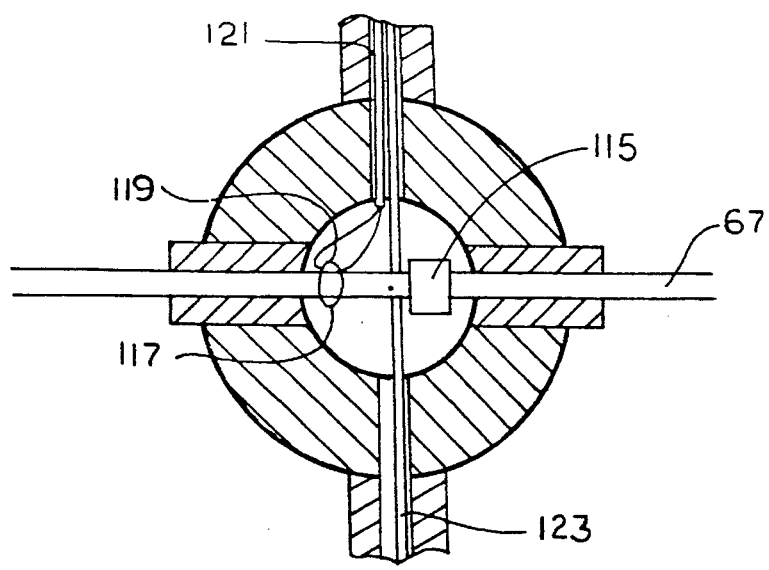
FIG. 5 is a detail view of section 5—5 of FIG. 4.

With reference to FIGS. 4 and 5, there will now be described the construction of the second receiving antenna assembly. Conductor 67 and a tuning capacitor 115 are interconnected to define a single-turn, tuned receiving antenna. The capacitance value of capacitor 115 is 0.012, microfarads. In combination with a conductor forming a one-turn loop of 6 ½ inch diameter, tuning capacitor 115 makes the receiving antenna highly sensitive in the frequency region embracing 2 Mhz. This is so because the capacitive reactance is equal (but opposite in phase from) the inductive reactance and therefore the loop impedance is minimum (and essentially resistive). In operation, an alternating current is induced in the loop circuit defined by conductor 67 and capacitor 115 while an electromagnetic wave propagates through the formation. The magnitude of this alternating current depends on, among other things, the impedance of the loop circuit. At 2 Mhz, the impedance of the loop circuit is about 0.5 ohms. Within junction box 113, conductor 67 extends through the aperture of a ferrite ring 117 that defines the core of a high efficiency transformer. Conductor 67 defines the primary of the transformer. A toroidal winding 119 defines the secondary of the transformer and provides a receiver pick-up signal that is coupled to receiver circuitry via a coaxial cable 121. The first receiving antenna assembly has the same construction as the second receiving antenna assembly, and a coaxial cable 123 extends from it through junction box 113 as shown in FIG. 5 to couple the pick-up signal from the first receiving antenna assembly to receiver circuitry.

Figure 6:
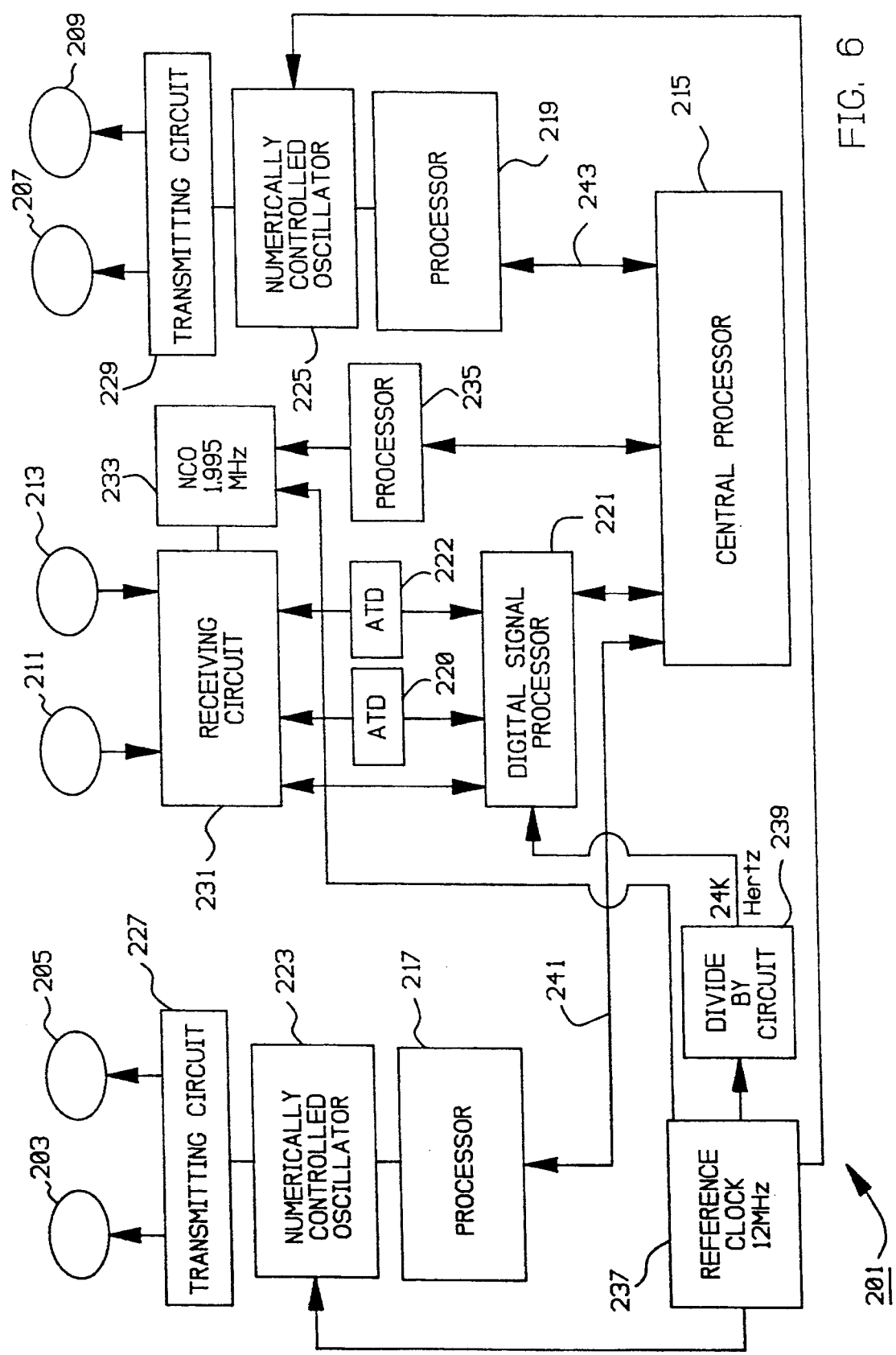
FIG. 6 is a block diagram view of the transmission and reception systems of the logging-while-drilling apparatus of the present invention.

4. TRANSMISSION AND RECEPTION SYSTEMS: FIG. 6 provides a block diagram view of an exemplary logging tool 201 constructed in accordance with the present invention. Logging tool 201 includes upper transmitters 203, 205, lower transmitters 207, 209, and intermediate series resonant receiving antennas 211, 213. Central processor 215 is preferably a microprocessor device which is utilized to coordinate the operation of the components of logging tool 201, to record and process the data obtained from measurements made by intermediate series resonant receiving antennas 211, 213, and to interact with the mud pulse telemetry data transmission system carried in the adjoining drill collar member. Processor 217 is provided and dedicated for the control of numerically controlled oscillator 223. Processor 219 is provided and dedicated for the control of numerically controlled oscillator 225. Central processor 215 communicates with processors 217, 219 via data buses 241,243 respectively. Numerically controlled oscillators 223, 225 are adapted to receive a binary command signal as an input, and to produce an analog output having particular frequency, phase, and amplitude attributes. The frequency, phase, and amplitude attributes are determined at least in part by the command signals applied from processor 217, 219 to the input of numerically controlled oscillators 223, 225, and the data contained in various registers within numerically controlled oscillators 223, 225. Numerically controlled oscillators 223, 225 provide the analog signal to transmitting circuits 227, 229 respectively. The components which make up transmitting circuits 227, 229 will be described in greater detail in connection with a technique of the present invention of quantifying the undesirable magnetic field mutual coupling between particular antennas.

Receiving antennas 211, 213, communicate through analog receiving circuit 231 with the first and second data input channels of a digital signal processor 221. The digital signal processor 221 receives data at the first and second inputs after it is converted from analog form to digital form by analog-to-digital converters 220, 222, and records the data elements in a circular memory buffer. Central processor 215 pulls data from the buffers in a prescribed and predetermined manner in order to sample the current which is generated in receiving antennas 211, 213 in response to the propagation of electromagnetic signal through the adjoining formation. As is conventional, the resistivity of the formation surrounding the logging tool 201 may be determined by either (1) determining the amplitude attenuation of an electromagnetic wave propagating through the formation adjoining receiving antenna 211 and receiving antenna 213, or (2) by determining the phase shift between the electromagnetic signal propagating through the formation adjoining receiving antenna 211 and 213, or from both. These measurements comprise a relative measurement of the amplitude attenuation and a relative measure of the phase shift.

The present invention also allows other techniques for quantifying the electromagnetic field which propagates through the formation surrounding logging tool 201. Since precise control can be obtained with the present invention over the frequency, phase, and amplitude of the electromagnetic wave generated by transmitting antennas 203, 205, 207, and 209, the present invention allows the measurement of the absolute amplitude attenuation of electromagnetic signal between any particular transmitting antenna 203, 205, 207, and 209 and any particular receiving antenna 211, 213. Furthermore, the logging tool 201 of the present invention allows for the absolute measurement of the phase shift of an electromagnetic signal between any particular transmitting antenna 203, 205, 207, 209 and any particular receiving antenna 211,213. Prior art devices do not allow such optional techniques for determining amplitude attenuation and phase shift, since prior art devices are unable to determine easily and precisely the frequency, phase, and amplitude of a signal generated at any particular transmitting antenna.

The operation of numerically controlled oscillators 223, 225 is clocked by the output of reference clock 237, which is preferably 12 megahertz. The operation of receiving circuit 231 is controlled by the output of numerically controlled oscillator 231, which is also clocked by the output of the reference clock 237, which is 12 megahertz. Thus, a clocking pulse is provided to numerically controlled oscillator 223, 225 at a frequency identical to that which is provided to numerically controlled oscillator 223, which establishes the operating frequency of receiving circuit 231. Digital signal processor 221 is clocked by the output of divide-by circuit 239, and thus samples the output of receiving circuit 231 at a particular frequency which is much less than that utilized to energize transmitter antennas 203, 205, 207 and 209.

Numerically controlled oscillator 233 produces a phase-locked sine-wave signal with a center frequency of 1.995 Mhz, that is used as a local oscillator signal by receiving circuit located in electronics housing 73 (of FIG. 2A).

Figure 7:
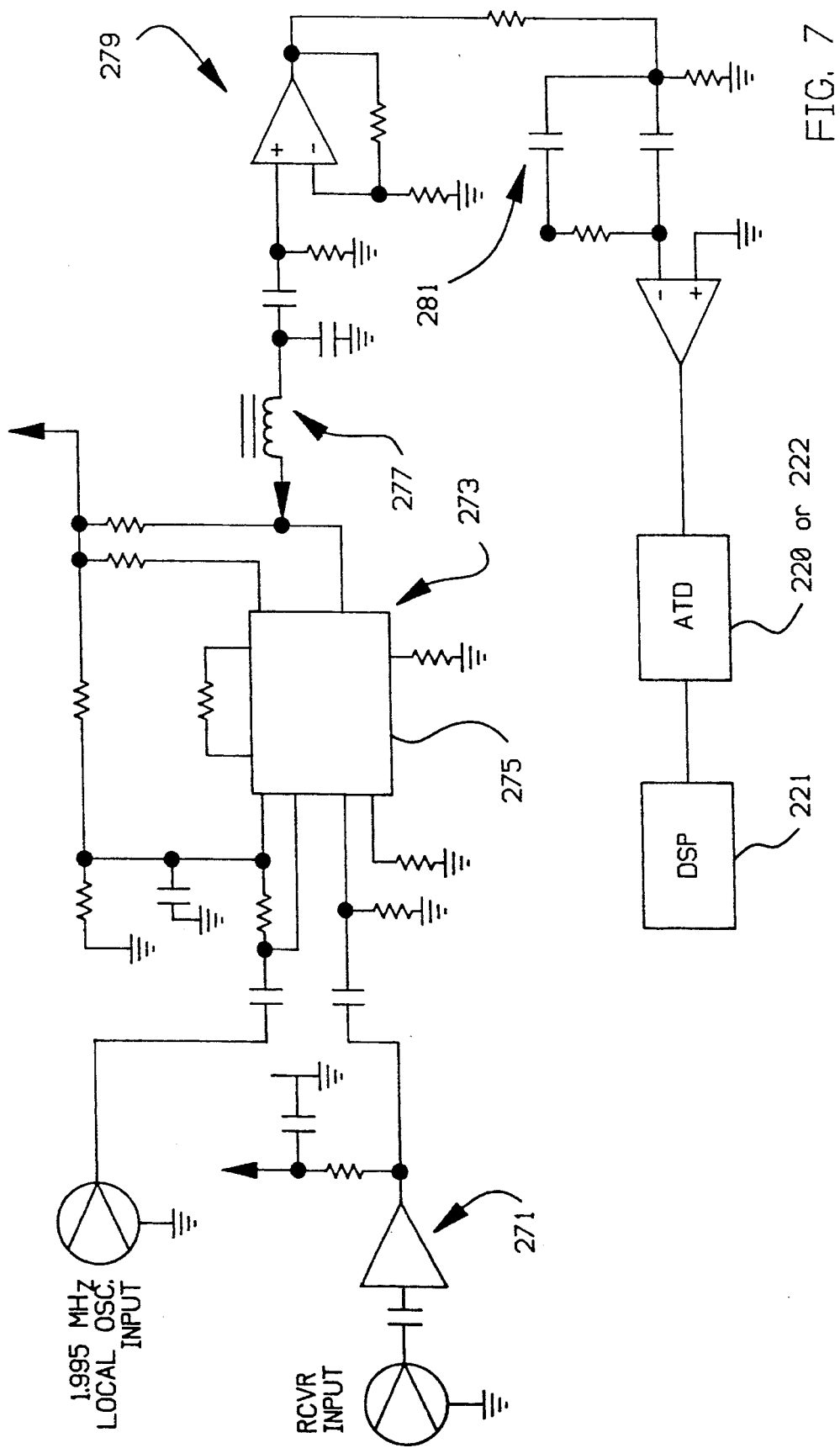
FIG. 7 is an electrical schematic of the receiving circuits of the block diagram of FIG. 6.

Reference is now made to FIG. 7. The overall function of the circuitry depicted in block diagram and schematic form in FIG. 7 is to respond to the local oscillator signal and one of the two receiver coil output signals to produce a receiver phase output signal relative to the transmitter and a receiver amplitude output signal. A conventional pre-amp circuit generally indicated at 271 responds to the receiver pick-up signal and its output is applied to a mixer circuit arrangement generally indicated at 273. Mixer circuit arrangement 273 includes an integrated circuit 275 that suitably is implemented by an integrated circuit manufactured and sold by Motorola and other companies under the designation MC 1596.

Because the frequency of the pick-up signal and the local oscillator signals are phase-locked to a common frequency reference and differ by 6 Khz, the intermediate frequency (IF) produced by mixer circuit arrangement 273 is at 6 Khz. A band pass tuning circuit arrangement generally indicated at 277 passes the 6 Khz IF signal to an amplifier circuit arrangement generally indicated at 279. An active band pass filter circuit arrangement generally indicated at 281 provides further band pass filtering and provides a signal to an analog-to-digital converter, which supplies a digital input to a particular input channel of digital signal processor 221 (of FIG. 6).

Figure 8A:
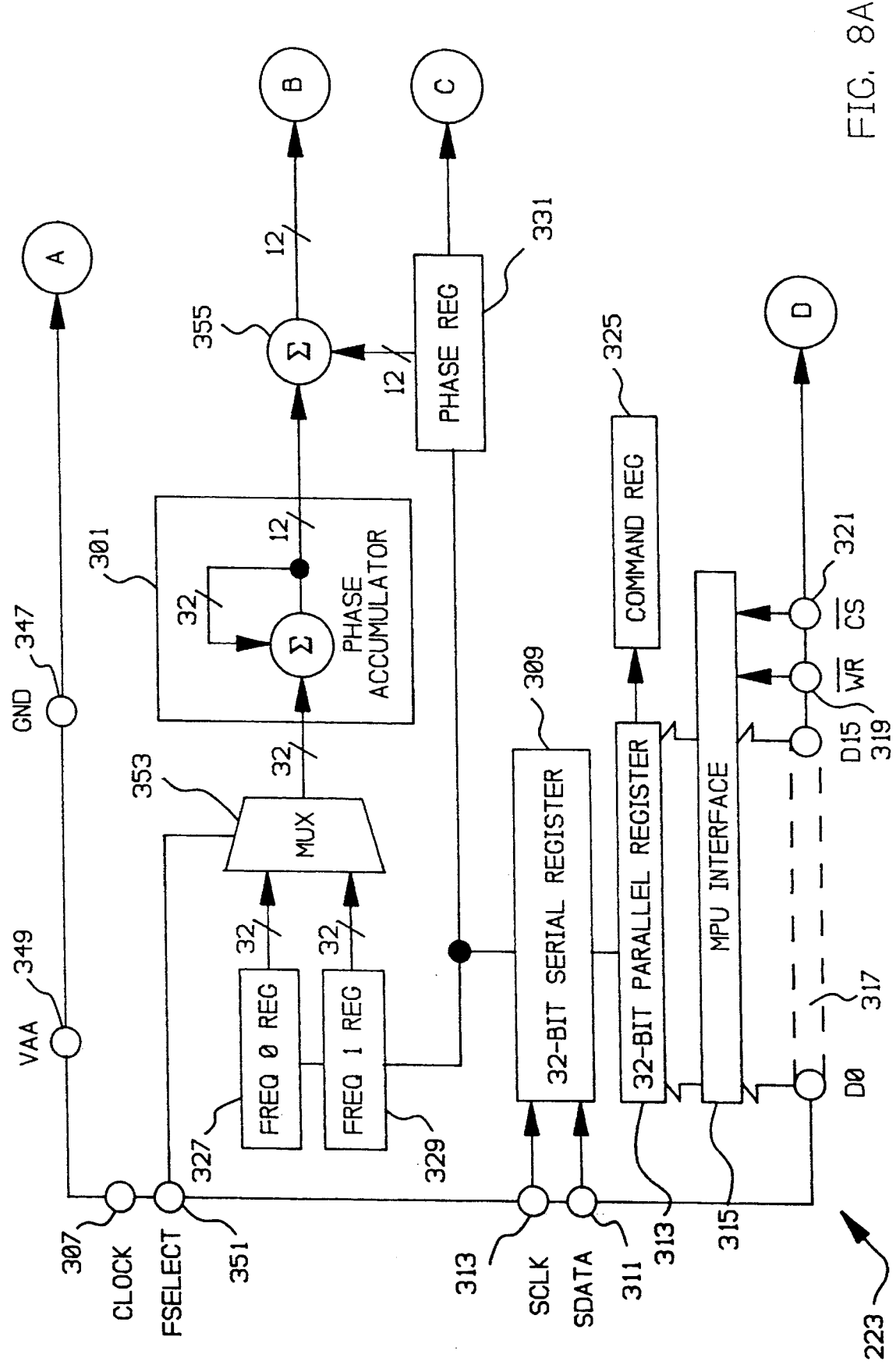
FIG. 8 is a block diagram view of the numerically-controlled oscillators of the block diagram of FIG. 6.
Figure 8B:
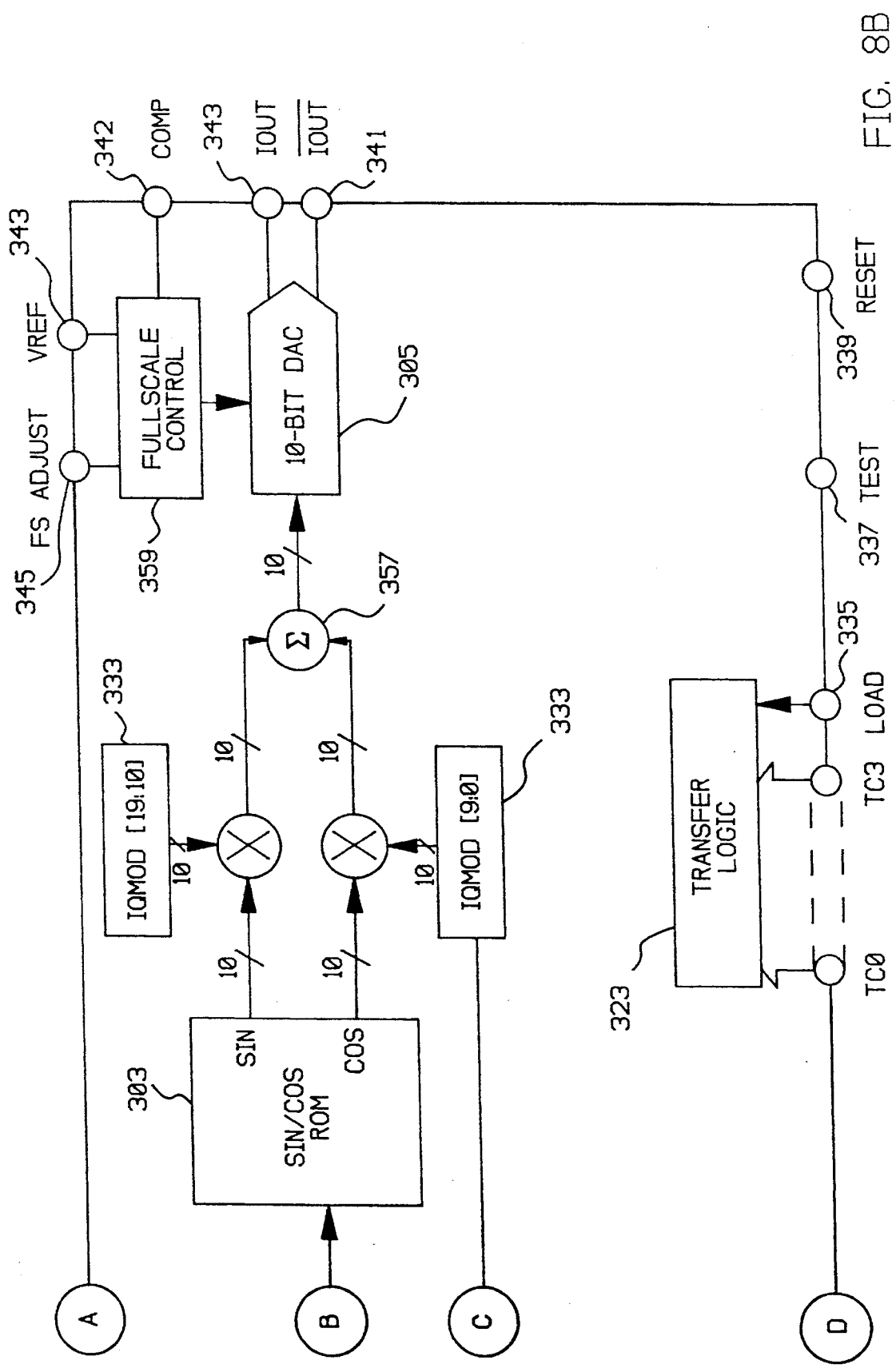

FIG. 8 is a block diagram view of the numerically-controlled oscillators 223, 225, 233 of FIG. 6. Since the numerically-controlled oscillators are identical, only numerically-controlled oscillator 223 will be discussed and described. In the preferred embodiment of the present invention, numerically-controlled oscillator 223 comprises a CMOS, DDS modulator manufactured by Analog Devices of Norwood, Mass., which is identified by Model No, AD7008. The numerically-controlled oscillator 223 includes a thirty-two bit phase accumulator 301, a sine and cosine look-up table 303, and a ten-bit digital to analog converter 305. Clock input 307 is provided to receive a clocking signal from a device which is external to the numerically-controlled oscillator 223. The particular numerically-controlled oscillator of the present invention is adapted to accept clock rates as high as twenty megahertz to fifty megahertz, but can accommodate much lower clock rates. The device purports to have a frequency accuracy which can be controlled to one part in four billion. Numerically-controlled oscillator 223 includes a thirty-two bit serial register 309 which receives serial data at serial data input pin 311, which is clocked into the register in accordance with a clock signal which is supplied to serial clock input 313. A thirty-two bit parallel register 313 is also provided which receives parallel binary data from MPU interface 315. Data bus 317 includes sixteen digital input pins identified as DO through D15. The chip select pin 321 is utilized when writing to the parallel register 313. The write pin 319 is also utilized when writing to the parallel register 309. The transfer control address bus 323 is utilized to determine the source and destination registers that are used during a transfer. A source register can be either the parallel assembly register 313 or the serial assembly register 309. The destination register can be any one of the following registers: the command register 325, the FREQ0 register 327, the FREQ1 register 329, the phase register 331, the IQMOD register 333. The command register is written to only through the parallel assembly register 313. The contents of the command register determine the operating state of the numerically-controlled oscillator 223. In the preferred device utilized in the present invention, the command register is a four bit register. The content of this register determines the operating state of the numerically-controlled oscillator. A table in the product literature for the preferred numerically-controlled oscillator 223 provides an overview of the possible operating states of the numerically-controlled oscillator 223 which is utilized in the present invention. During logging operations, the logging apparatus of the present invention is programmed to provide commands from processors 215, 217, 219 (of FIG. 6) with eight-bit commands, so the "CR0" bit is 0. Normal operation is desired, so the "CR1" bit is 0. In the present invention, amplitude modulation is bypassed, so the "CR2" bit is 0. In the present invention, the synchronizer logic is enabled, so the "CR3" bit is 0. The FREQ0 register 327 defines the output frequency of the numerically-controlled oscillator 223, when the FSELECT pin is 1, as a fraction of the frequency of the clock signal applied to clock pin 307. The FREQ1 register 329 defines the output frequency of the numerically-controlled oscillator 223, when FSELECT equals 1, as a frequency of the clock signal applied to clock pin 307. The contents of the phase register 331 are added to the output of the phase accumulator 301. The IQMOD register 333 is not utilized in the present invention.

The operations which can be performed with the registers by supplying command signals to transfer control address bus 323 are set forth in tabular form in the tables of the product literature for the preferred numerically-controlled oscillator. Three basic operations can be performed. The contents of the parallel assembly register 313 can be transferred to command register 325; the contents of the parallel assembly register can be transferred to a selected destination register, in accordance with the destinations identified; and the contents of the serial assembly register 309 can be transferred to a selected destination register of those identified.

The load register pin 335 is utilized in conjunction with the transfer control address bus 323 to control loading of internal registers from either the parallel or serial assembly registers 309, 313. The test pin 337 is utilized only for factory testing. The reset pin 339 is utilized to reset the registers. The reset pin in particular is utilized to clear the command register 325 and all the modulation registers to 0. The current output pins 341, 343 are utilized to supply an alternating current to a selected end device. In the particular embodiment of the present invention, only one of these outputs is utilized for a particular transmitting antenna, since one current is the compliment of the other current. The compensation pin 342 is utilized to compensate for the internal reference amplifier. The voltage reference pin 343 can be utilized to override an internal voltage reference, if required. The full-scale adjust pin 345 determines the magnitude of the full scale current at output pins 341, 343. The ground pin 347 provides a ground reference, while the positive power supply pin provides power for the analog components within numerically-controlled oscillator 323. The frequency select pin 351 controls frequency registers FREQ0 register 327 and FREQ1 register 329, by determining which register is used in the phase accumulator 301 by controlling multiplexer 353. The contents of phase register 331 is added to the output of phase accumulator 301 at sumer 355. The IQMOD registers 333 are provided to allow for either quadrature amplitude modulation or amplitude modulation, so the sine and cosine outputs of look-up table 303 are added together at sumer 357, and are unaffected by the IQMOD registers 333. The output of sumer 357 is provided to digital-to-analog converter 305, which creates an analog signal having a frequency which corresponds to either the contents of the FREQ0 register 327 or the FREQ1 register 329, a phase which is determined by the output of sumer 355 which is provided as an input to look-up table 303, and an amplitude which is determined by full scale control 359 which is set by full scale adjust pin 345 and reference voltage pin 343. Therefore, the numerically-controlled oscillator of FIG. 8 can provide an analog output having a precise frequency attribute, phase attribute, and amplitude attribute. Since the device is extremely accurate, it is possible to provide a driving current for the transmitting antennas 203, 205, 207, 209 of FIG. 6 which is controlled precisely. In the preferred embodiment of the present invention, one of transmitting antennas 203, 205 is operated at 400 kilohertz, while the other of transmitting antennas 203, 205 is operated at 2 megahertz. The same is true for antennas 207, 209, with one being operated at 400 kilohertz and the other being operated at 2 megahertz. However, the processors 215, 217, 219 can be programmed to provide any particular frequencies for the transmitting antennas. This will be used to good advantage as will be described below in connection with a calibration routine.

In operation, a command signal is supplied to the FSELECT pin 351 to determine which frequency will be utilized for energizing a particular transmitting antenna. The FREQ0 register 327 and FREQ1 register 329 may be preloaded with two particular frequencies (such as 400 kilohertz and 2 megahertz). The binary signal applied to the FSELECT pin 351 determines the operation of multiplexer 353, which supplies the contents of either FREQ0 register 327 or FREQ1 register 329 of the input of phase accumulator 301. Phase accumulator 301 accumulates a phase step on each clock cycle. The value of the phase step determines how many clock cycles are required for the phase accumulator to count two η radians, that is, one cycle of the output frequency. The output frequency is determined by the phase step multiplied by the frequency of the signal applied to the clock input pin 307 divided by $2^{32}$. In practice, the phase accumulator 301 is cleared, then loaded with the output of multiplexer 353. Then, a predefined time interval is allowed to pass, during which the signal applied to clock input pin 307 steps the output of phase accumulator 301 through an incrementally increasing phase for the particular frequency. In other words, phase accumulator steps from 0° phase to 180° for a particular frequency. At any time, the output of phase accumulator 301 may be altered by a phase offset which is supplied by phase register 331. Phase register 331 may be loaded in response to commands from processors 215, 217, 219. The phase value is supplied as input to look-up table 303, which converts the output of the phase accumulator 301 (and any desired offset) into a digital bit stream which is representative of an analog signal. This digital bit stream is supplied as an input to the 10-bit digital-to-analog converter 305 which also receives amplitude information from full scale control 359. The digital-to-analog converter 305 supplies an analog output with a particular frequency attribute, phase attribute, and amplitude attribute. For example, an output of 2 megahertz, with 15° of phase, and a particular peak amplitude current may be provided as an input to a particular transmitting antenna.

Figure 9:
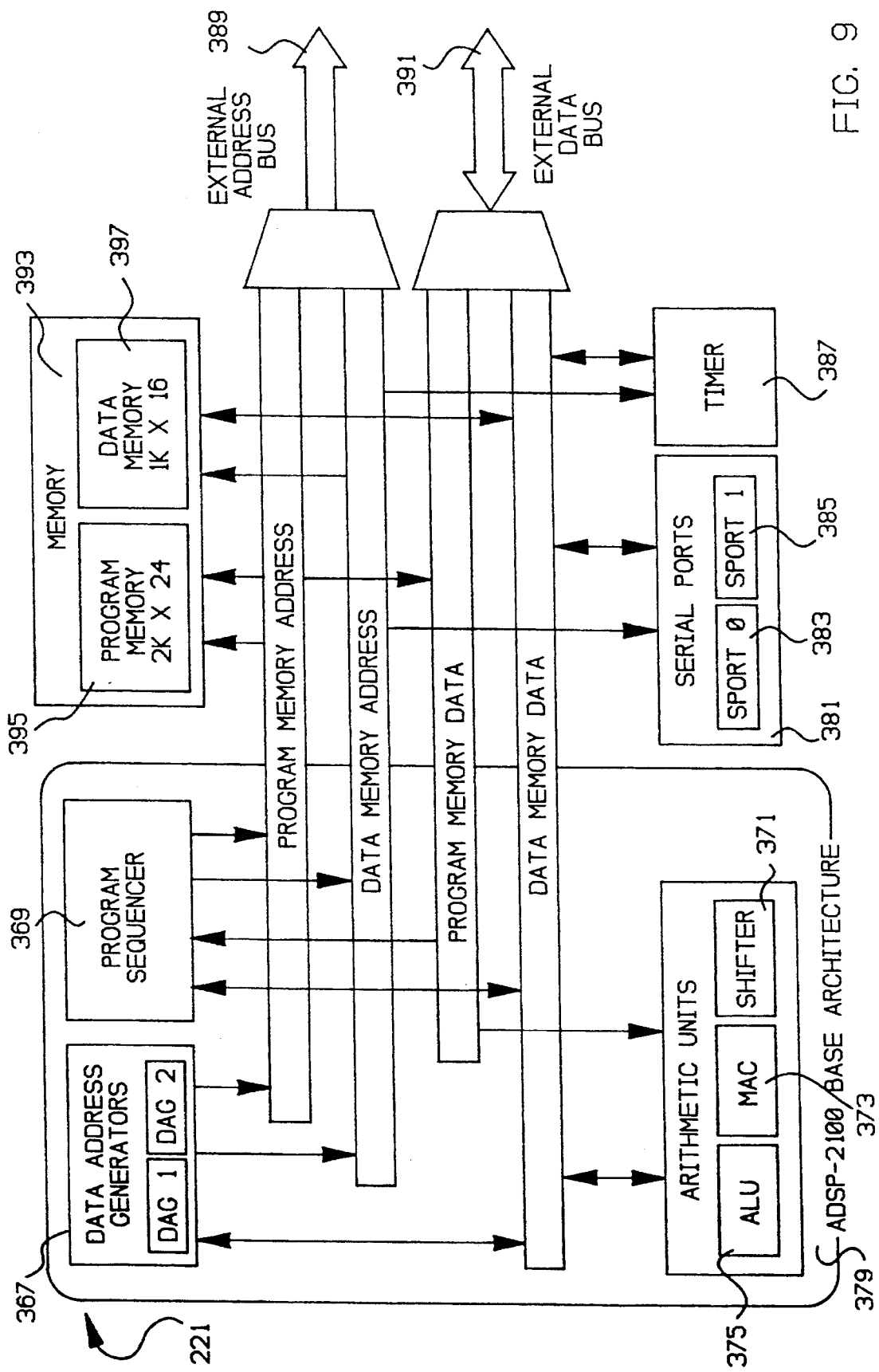
FIG. 9 is a block diagram view of the digital signal processor of the block diagram of FIG. 6.

FIG. 9 is a block diagram view of the digital signal processor 221 of FIG. 6. In the preferred embodiment of the present invention, digital signal processor 221 comprises a DSP microcomputer manufactured by Analog Devices of Norwood, Mass., which is identified as Model No. ADSP-2101. This is a single-chip microcomputer which is utilized for high-speed numeric processing applications. Its base architecture 379 is a fully compatible superset of the ADSP-2100 instruction set. The base architecture includes three independent computational units: shifter 371, multiplier/accumulator 373, and arithmetic and logic unit (ALU) 375. Program sequencer 369 supports a variety of operations including conditional jumps, subroutine calls, and returns in a single cycle. Data address generator 367 includes two address generators. Digital signal processor 221 includes serial port 381 which includes two input channels: input channel 383, and input channel 385. Timer 387 provides timing signals for the data processing operation, and receives as an input a clock signal from divide-by circuit 239 (of FIG. 6). External address bus 289 and external data bus 391 allow digital communication between digital signal processor 221 and central processor 315 of FIG. 6. Memory 393 includes program memory 395 and data memory 397. As is typical with digital signal processors, data memory 397 defines at least two circular buffers associated with serial ports 383, 385, which are designed to receive asynchronous digital data, and store it indefinitely or for a predetermined time interval. The digital signal processor 221 receives digital inputs at channel inputs 383, 385 from an analog-to-digital converter, such as is depicted in the circuit of FIG. 7. The receiving circuit of FIG. 7 receives a current which is representative of the response of a particular receiving antenna 211, 213 to electromagnetic radiation propagating through the borehole. This electrical signal is processed through the circuit components of FIG. 7, and is provided as an input to digital signal processor 221. In the preferred embodiment of the present invention, receiving antenna 211 is identified with a particular input channel of digital processor 221, while receiving antenna 213 is identified with the other input channel of digital signal processor 221. Central processor 215 (of FIG. 6) utilizes external address bus 389 and external data bus 391 to address a particular input channel and read digital data into central processor 215 for processing. In the preferred embodiment of the present invention, digital signal processor 221 can sample data from receiving antennas 211, 213 at a very high sampling rate, which can be read periodically by central processor 215 which processes the data to determine the amplitude attenuation and phase shift of the electromagnetic signal which is propagated through the borehole. One particular routine for calculating amplitude attenuation and phase shift is set forth in greater detail herebelow, in connection with a discussion of the error cancellation feature of the present invention. In broad overview, central processor 215 can pull a selected amount of data from each channel of digital signal processor 221, and from that data calculate the amplitude attenuation and phase shift of the electromagnetic wave as it propagates through the wellbore and past receiving antenna 211 and receiving antenna 213. In the preferred embodiment of the present invention, an upper transmitter transmits an interrogating electromagnetic signal of a particular frequency which propagates downward past receiving antennas 211, 213. Then, a particular one of lower transmitting antennas 207, 209 propagate an interrogating electromagnetic signal upward. Measurements from receiving circuit 231 are stored in the input channels of digital signal processor 221, and read by central processor 215 in a manner which allows for the calculation of amplitude attenuation and phase shift.

Another important feature of the present invention arises from the fact that a precise energizing current can be utilized to energize a particular one of transmitting antennas 203, 205, 207, 209. This will establish the frequency attribute, phase attribute, and amplitude attribute of the electromagnetic interrogating signal. Therefore, a single receiving antenna can be utilized to make the measurement of the electromagnetic interrogating signal as it passes through the wellbore. The amplitude and phase of that interrogating signal can be recorded in memory, and compared with values in memory for the energizing current. This allows a single receiving antenna to be used to provide an accurate measure of amplitude attenuation between that particular receiving antenna and the particular transmitting antenna, and the phase shift of the interrogating signal between the transmitting antenna and the receiving antenna. Of course, the amplitude attenuation and phase shift of the electromagnetic interrogating signal as it passes through the formation is indicative of the resistivity of the wellbore and surrounding formation.

Figure 10A:
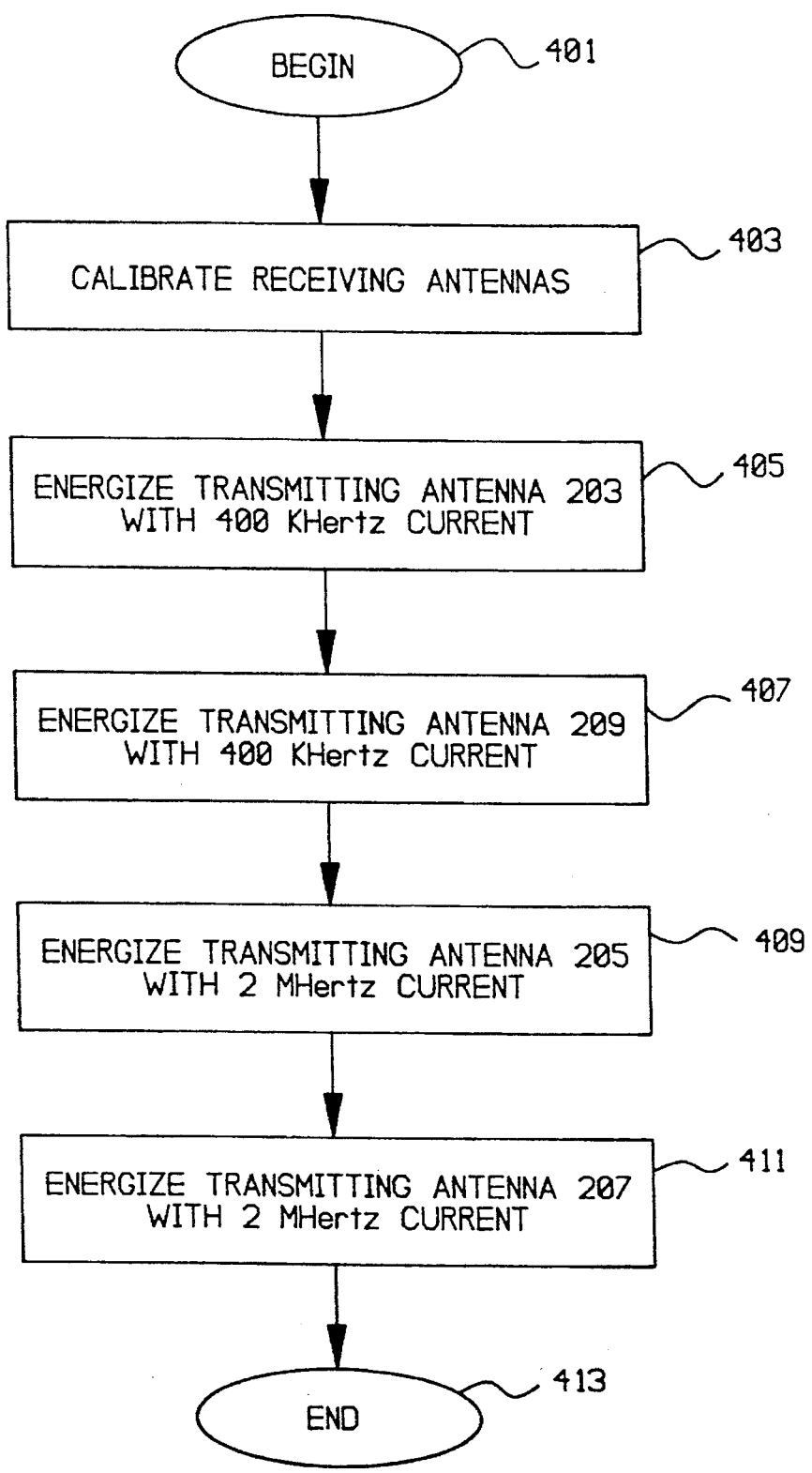
FIGS. 10A, 10B, and 10C, are high level flowchart representations of tool operation in accordance with the preferred embodiment of the present invention.
Figure 10B:
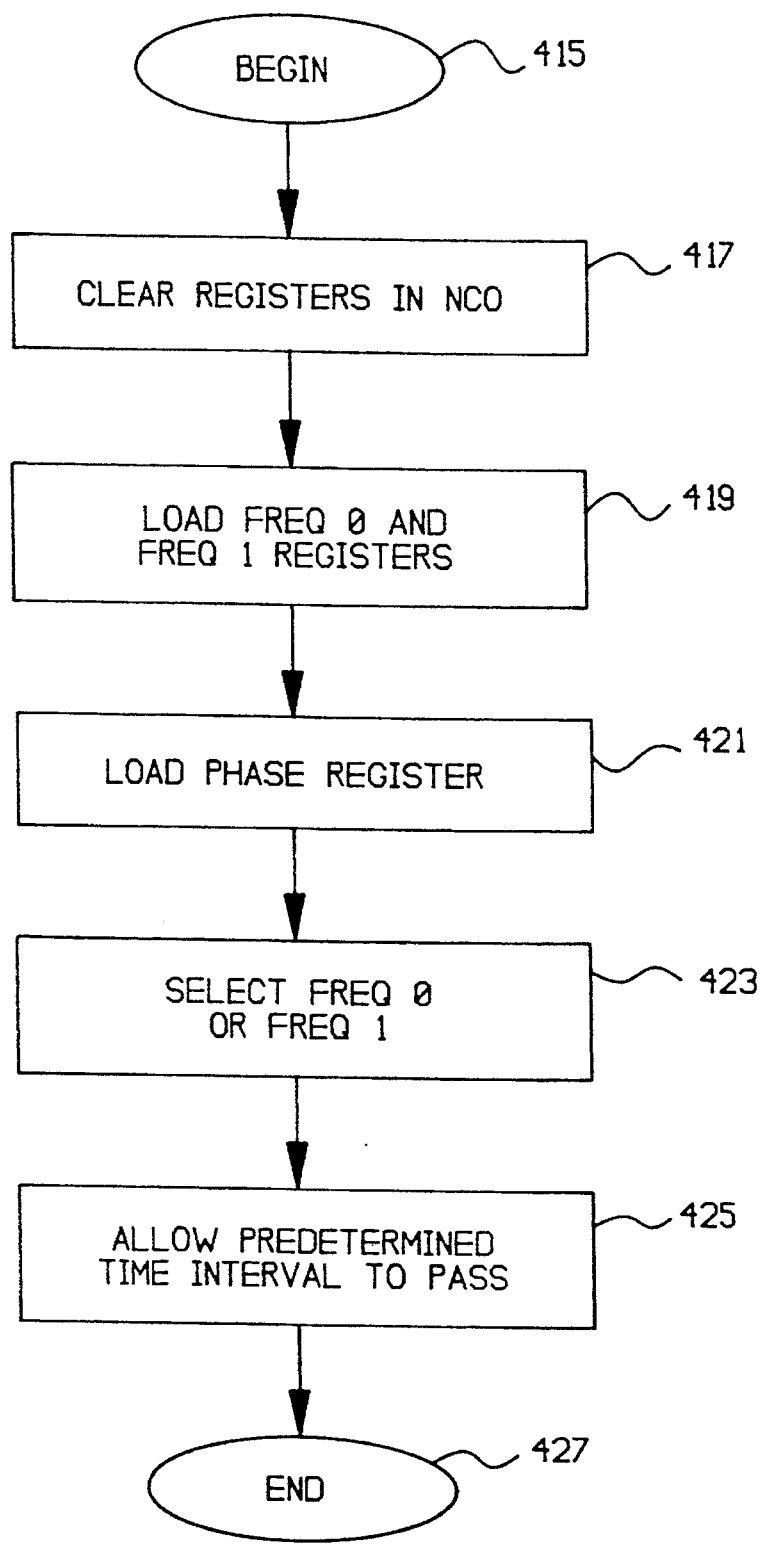
Figure 10C:
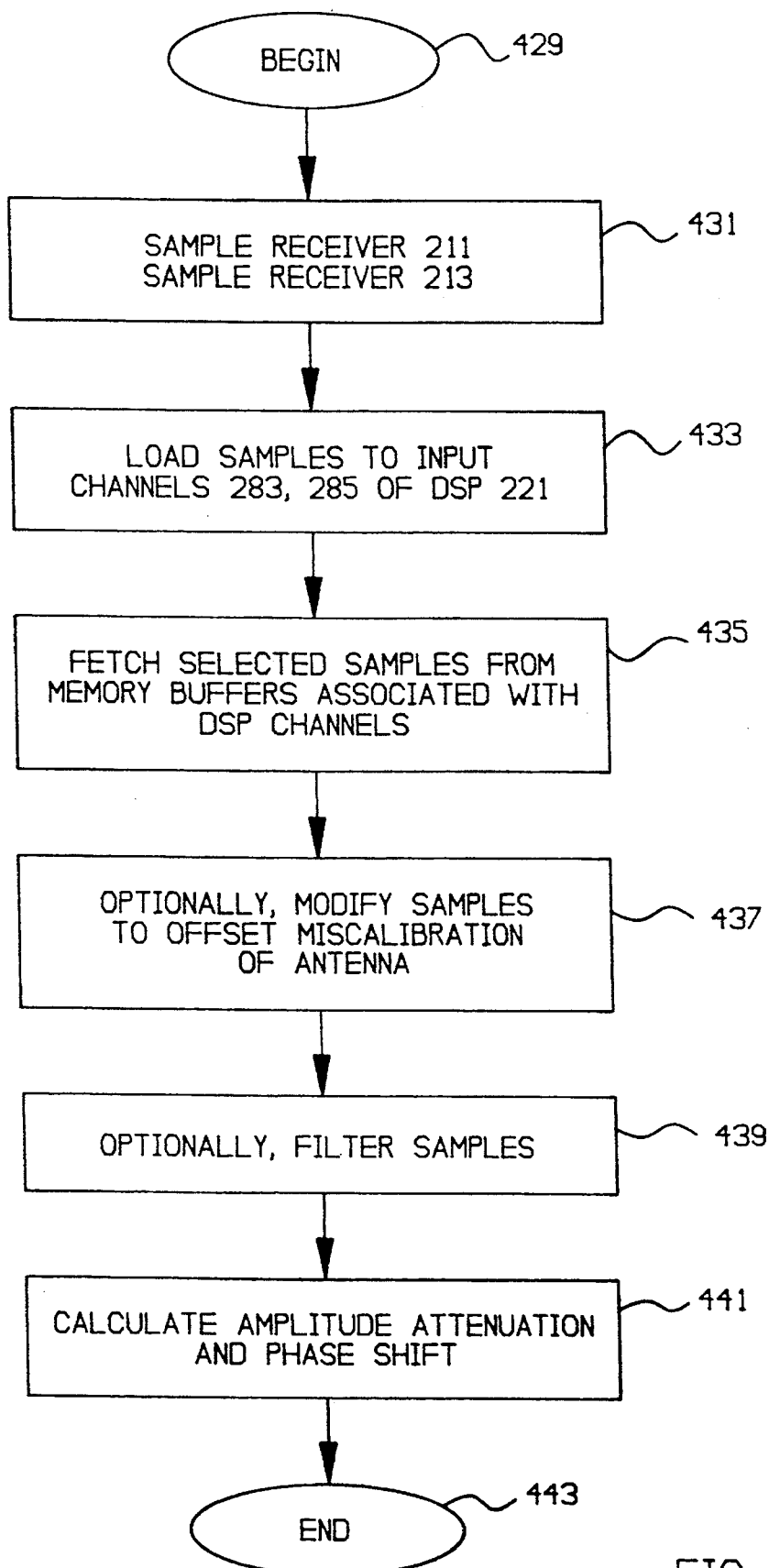

FIGS. 10A, 10B, and 10C provide high level flowchart representations of logging operations performed in accordance with the preferred embodiment of the present invention. FIG. 10A depicts logic steps which are performed by central processor 215. FIG. 10B represents operations controlled by processors 217, 219. FIG. 10C depicts operations controlled by digital signal processor 221 and central processor 215. The transmission operations begin at block 401. Processor 215 performs a calibration operation upon receiving antennas 211, 213, as will be discussed in greater detail elsewhere in this application. After the calibration operations are performed central processor 215 instructs processor 217 to energize transmitting antenna 203 with a 400 kilohertz current. Then, in accordance with block 407, central processor 215 instructs processor 219 to energize transmitting antenna 209 with a 400 kilohertz current. Next, central processor 215 instructs processor 217 to energize transmitting antenna 205 with a 2 megahertz current, in accordance with block 409. Then, in occurrence with block 411, central processor 215 instructs processor 219 to energize transmitting antenna 207 with a 2 megahertz current. The process stops at block 413. In actual practice, transmission operations will be performed continuously over predefined intervals.

FIG. 10B depicts the control operations performed by processors 217, 219 to cause numerically controlled oscillators 223, 225 to energize particular transmitters. The process begins at block 415. It continues at block 417, wherein the processor 217 or 219 clears the registers in numerically controlled oscillators 223 or 225 by providing the appropriate instruction. Then, in accordance with block 419, processor 217 or 219 loads a predetermined value to the FREQ0 register and the FREQ1 register. These values determine the frequency of the energizing current which is supplied to a particular transmitting antenna. Then, in accordance with block 421, processor 217 or 219 loads a predetermined phase value to the phase register of numerically controlled oscillator 223 or 225. Processor 217 or 219 then provides a binary command to the FSELECT input pin of numerically controlled oscillator 223 or 225 to select a particular frequency of operation. Then, in accordance with block 425, a particular time interval is allowed to pass. This time interval determines how many cycles of energizing current are applied to a particular transmitting antenna. The process ends at software block 427. Typically, each time processor 217 or 219 is instructed by central processor 215 to energize a particular transmitting antenna, the steps of FIG. 10B are performed.

FIG. 10C depicts in flowchart for the reception operations. The process begins at block 429. The process continues at block 431, wherein the current within receiving antennas 211, 213 are sampled by receiving circuit 231. Then, in accordance with block 433, these samples are loaded to the appropriate input channels 283, 285 of digital signal processor 221. In accordance with block 435, central processor 215 fetches selected samples from the memory buffers associated with the digital signal processor input channels. In accordance with block 437, optionally, samples may be modified to offset for error components due to "miscalibration" of the antenna, which will be described in greater detail elsewhere in this application. Next, in accordance with software block 439, the digital samples may be digitally filter with either a low-pass digital filter, high-pass digital filter, or a bandpass digital filter. Alteratively, the samples can be averaged over predefined intervals to provide stability to the samples and eliminate the influence of spurious or erroneous samples. Next, in accordance with block 441, the amplitude attenuation and phase shift are calculated, as is described elsewhere in this application. Finally, the process ends at block 443.

5. ANTENNA CALIBRATION OPERATIONS: The utilization of microprocessors and numerically controlled oscillators in the present invention allows for very precise calibration measurements to be made of the transmission and reception of the interrogating signal either outside the borehole, or preferably in the borehole during logging operations. This is accomplished by having a calibration program resident in memory of processors 217, 219, or in central processor 215, which causes a numerically-controlled oscillator to step or sweep through a particular frequency range. This is accomplished by sequentially providing a command signal from processors 217, 219 to numerically controlled oscillators 223, 225 which establishes a frequency for the energizing current which is supplied to a particular transmitting antenna. Additionally, a command is supplied from processors 217, 219 to numerically controlled oscillators 223, 225 to establish the phase characteristic of the signal. In practice, the frequency sweep should include a fairly wide range of frequencies. Normal reception operations are conducted while a particular transmitter is swept through a range of frequencies. The data is recorded, and provides a combined measure of the response of the transmitting antenna and receiving antenna.

In the preferred embodiment of the present invention, each transmitting antenna is swept through a predetermined frequency range, while the receiving antennas are sampled. The result is eight sets of data, one for each possible transmitter/receiver combination, which quantifies the operating condition of the particular transmitting antenna and the particular receiving antenna. Malfunctions in a particular receiving antenna or transmitting antenna can be determined by comparisons between the eight data sets. For example, with reference to FIG. 6, supposing that transmitting antenna 203 is damaged or out of calibration. The data set which establishes the operating condition of transmitting antenna 203 and receiving antenna 211 can be compared with the data set which establishes the operating conditions of transmitting antenna 203 and receiving antenna 213 to determine that transmitting antenna 203, and not a particular receiving antenna, is damaged or out of calibration. The identification of a damaged or uncalibrated antenna is an important diagnostic tool. It can be utilized during logging operations to drop one or more of the transmitting or receiving antennas out of the normal operating cycle, once it has been detected that it is damaged, in order to maintain high quality logging information. Alternatively, the calibration data can be used in post-logging operations to modify, interpret, or manipulate the logging data to correct for intervals of measurement during which a particular transmitting antenna was damaged or fell out of calibration.

Figure 11:
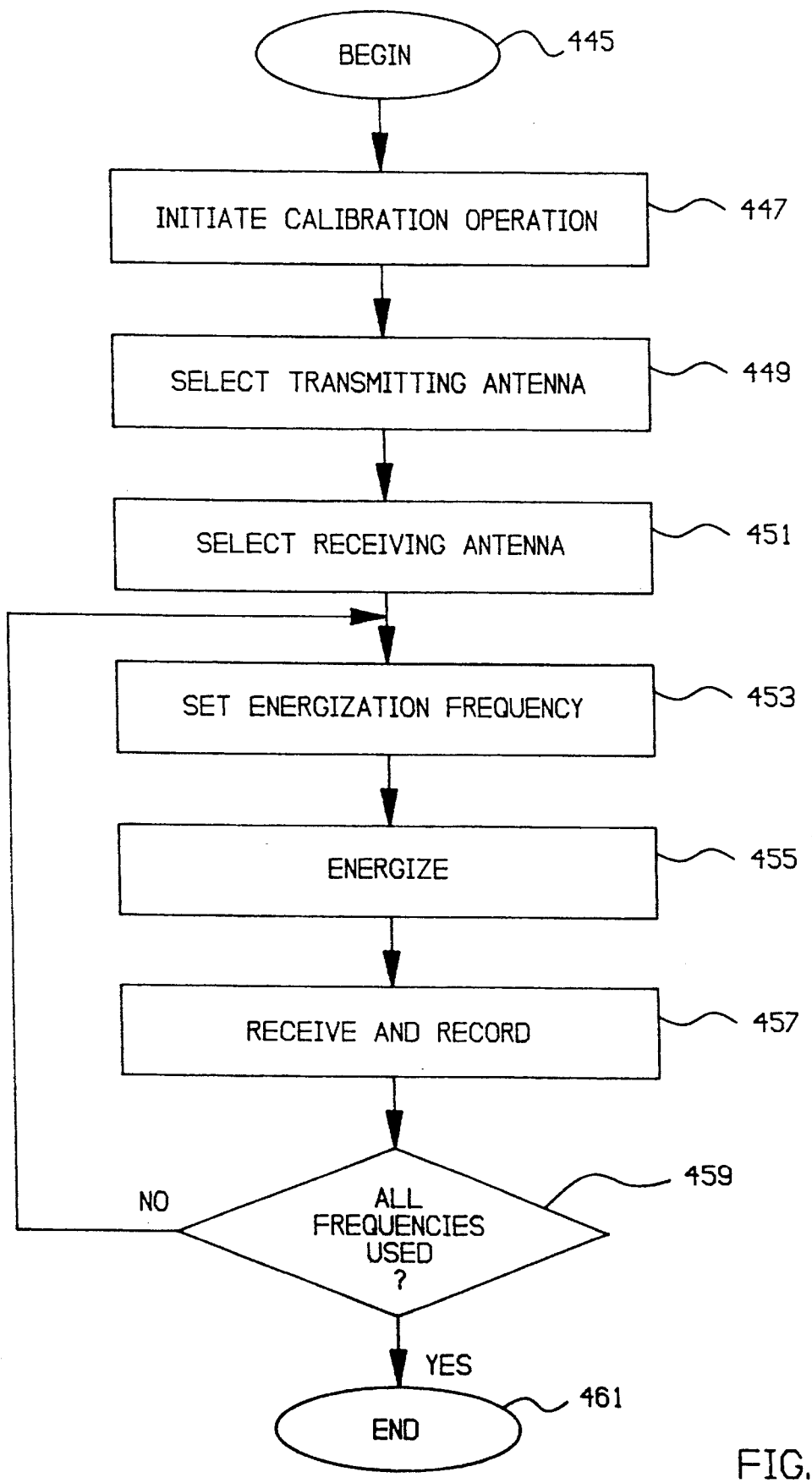
FIG. 11 is a high level flowchart representation of a digital calibration operation in accordance with the present invention.

FIG. 11 provides a high level flowchart representation of calibration operations, which of course is set forth in the context of the flowcharts of FIGS. 10A, 10B, and 10C. The process begins at block 445. The process continues at block 447, wherein the calibration operation is initiated by central processor 215. Then, in accordance with block 449, a particular transmitting antenna is selected; in accordance with block 451, a particular receiving antenna is selected. The calibration operations will be performed utilizing this particular transmitting antenna and this particular receiving antenna. The resulting data will provide information about the operating condition of both of these antennas. In accordance with block 453, an energization frequency is set. This is accomplished by providing an appropriate command to numerically controlled oscillator 223. Then, in accordance with block 455, the transmitting antenna is energized. In accordance with block 457, the receiving antenna is sampled, and the data is stored in memory. At block 459, one or more of the processors determine whether all the frequencies have been swept through. If not, the process continues at block 453, wherein the energization frequency is set, once again, at a higher frequency than the previous frequency utilized. However, if it is determined block 459 that all frequencies have been used, the process ends at block 461. In the preferred embodiment, a particular frequency range is stepped through in increments of fractional portions of 1 Hertz. For practical purposes, the calibration operation can be considered to be a sweep through all frequencies within a predetermined frequency range. The data that is recorded in memory can be analyzed in a manner discussed below to assess the operating condition of the transmitting antenna and the receiving antenna.

Figure 12:
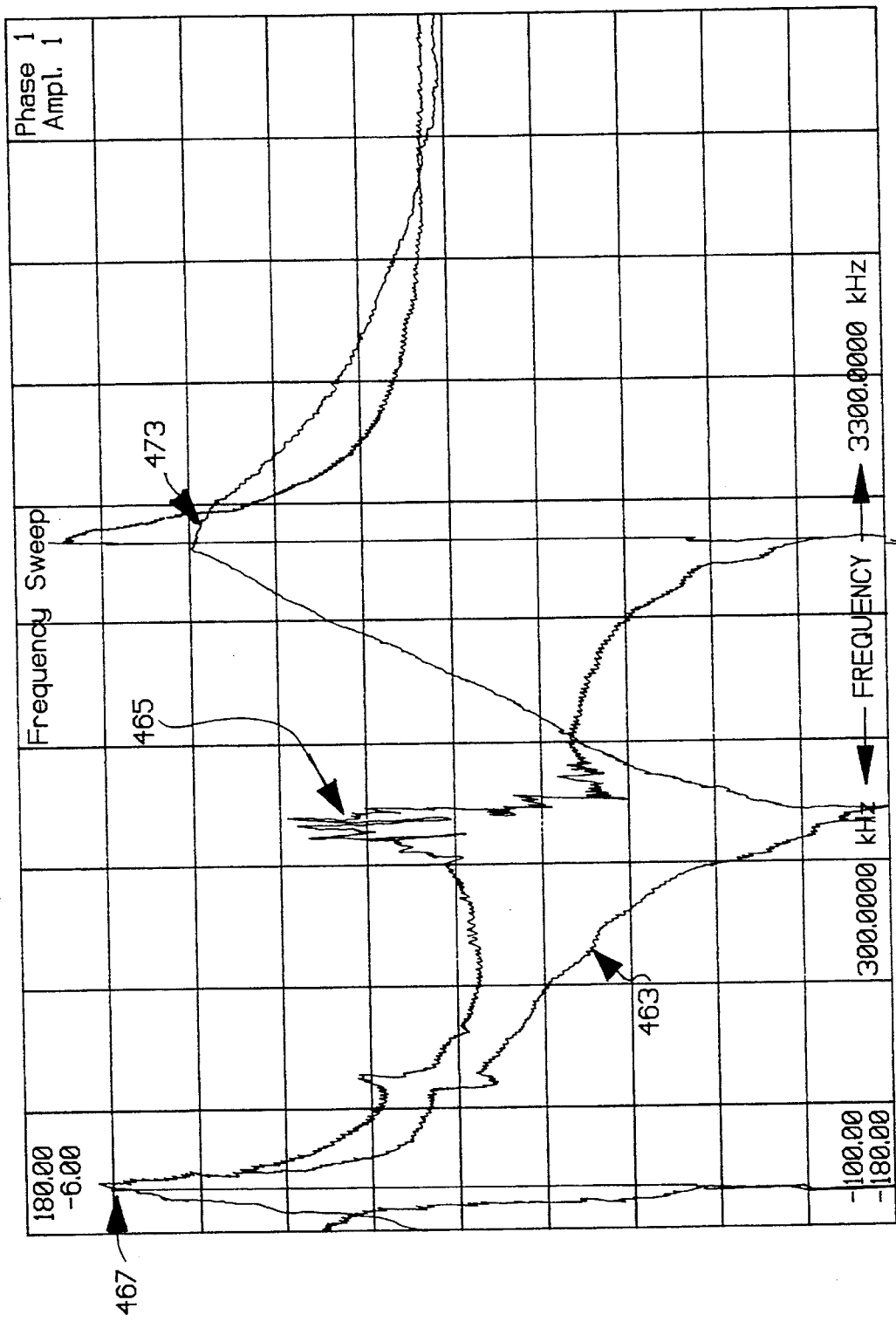
FIG. 12 is a graphical depiction of the amplitude, frequency, and phase shift data derived through a digital calibration operation.
Figure 13A:
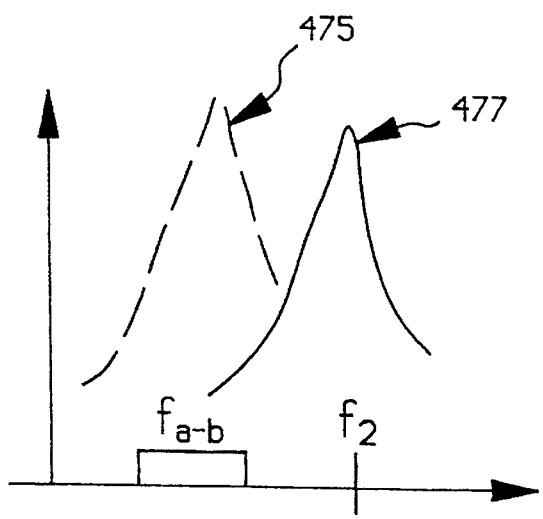
FIGS. 13A, 13B, and 13C graphically depict a variety of comparison operations which can be performed utilizing data derived from a digital calibration operation.
Figure 13B:
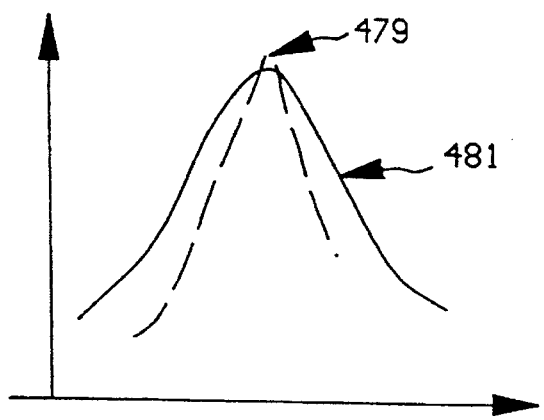
Figure 13C:
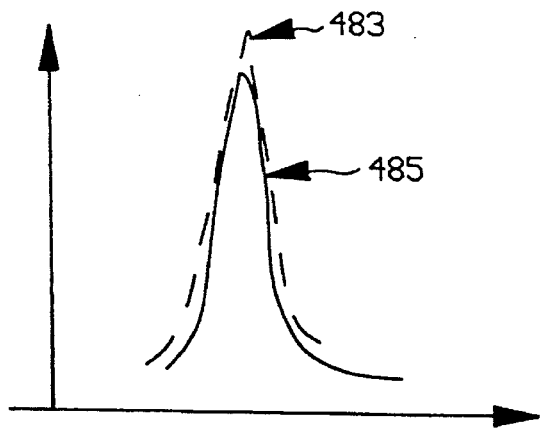

FIG. 12 provides a depiction of an example of the type of data that can be acquired during a calibration operation. Of course, during logging operations, the data will not be recorded or depicted in graphical form. Instead, a data array will be defined which includes information about the amplitude and phase attribute of the receiving antenna's response at a particular frequency. The graphical depiction in FIG. 12 is provided for purposes of exposition. In the view of FIG. 12, the amplitude of the response of the receiving antenna is depicted by curve 463. In FIG. 12, the phase of the response of the receiving antenna is depicted by curve 465. In order to determine when malfunctioning is occurring, it is necessary that a normal operating condition be preestablished. This should be done with regard to a range of acceptable operating conditions. The graph of FIG. 12 depicts normal operation over a range of 300 kilohertz to 3.3 megahertz. In the view of FIG. 12, amplitude peaks 467, 473 define two resonant frequencies for the transmitting and receiving antennas, with resonances occurring at 400 kilohertz and 2 megahertz, since the particular antennas utilized to generate this calibration graph were resonant at both 400 kilohertz and 2 megahertz. From the information contained in the measurements made when the tool is operating normally, parameters can be established to alert of malfunctioning. FIGS. 13A, 13B, and 13C graphically depict three techniques for detecting antenna malfunction. The first technique for detecting antenna malfunction is depicted in FIG. 13A wherein peak 475 is representative of either an amplitude or phase peak for normal operations. In contrast, peak 477, which is generated as a result of calibration operations during logging, indicates to the operator that a shift in the resonant frequency has occurred. A range of acceptable resonant frequencies can be established. If the measurement falls outside an acceptable range, a determination can be made that either the transmitting antenna or the receiving antenna is malfunctioning. FIG. 13B depicts another technique for detecting malfunctioning antennas. Peak 479 represents normal operations, while peak 481 represents a measurement made during logging. As can be measured by the width of the peak, the antenna Q for the actual measurement differs significantly from the antenna Q of the normal operating state. A change in the antenna Q can thus be used to indicate malfunctioning.

Figures 14, 15:
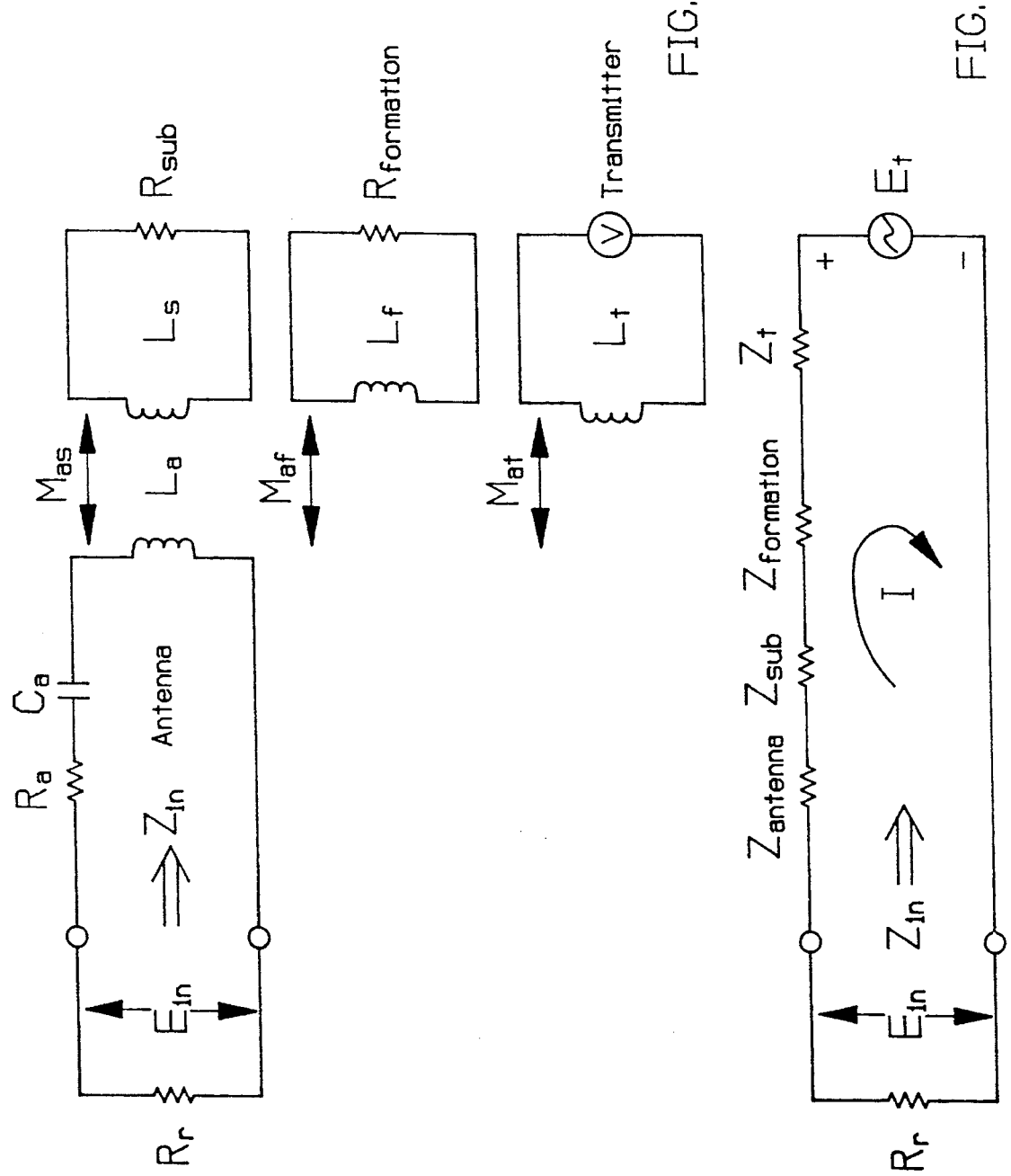
FIG. 14 is a simplified block diagram view of circuit and data processing components which can be utilized to measure the undesired mutual coupling between particular antennas.
FIG. 15 is an equivalent electrical circuit for the circuit of FIG. 14.

6. CORRECTION FOR MUTUAL COUPLING ERRORS: FIG. 14 provides an electrical schematic depiction of an equivalent circuit which depicts the relationship between antenna impedance and an antenna transfer function. This can be utilized to explain the inductive coupling which occurs in a logging tool. In this electrical schematic, the impedance of a receiving circuit is identified as $R_r$. The voltage $E_{in}$ across the receiver circuit input represents the receiving antenna's response to the measurement of the propagating electromagnetic field. $Z_{in}$ represents the impedance of the receiving antenna. The impedance includes $R_a$ which is the resistive component of the receiving antenna, $C_a$ which is the capacitive component of the receiving antenna, and $L_a$ which is the inductive component of the receiving antenna. This equivalent circuit is mutually magnetically coupled to the steel drill collar logging tool subassembly $R_{sub}$, the surrounding formation $R_{formation}$, and the transmitter. The subassembly is essentially a resistive component which is mutually coupled through inductive component $L_s$ to the receiving antenna. The formation is essentially a resistive component which is coupled magnetically to the receiving antenna through inductor $L_f$. The transmitter is essentially a voltage source which is coupled to the receiving through inductor $L_t$. The circuit of FIG. 14 can be reduced to the circuit depicted in FIG. 15, with the impedances of the antenna, the subassembly, the formation, and the transmitter represented respectively as: $Z_{antenna}$, $Z_{sub}$, $Z_{formation}$, and $Z_t$. $E_t$ is the equivalent voltage source in the receiver circuit due to the transmitter. A current 1 is induced to flow through this equivalent circuit by voltage source $E_t$. As is depicted in FIG. 15, a voltage $E_{in}$ is developed across the receiving circuitry as a result of this current flow. The combined impedance of the antenna, the drill collar subassembly, the formation, and the transmitter is represented in this view as $Z_{in}$. The impedance of the receiving antenna, along with the impedances introduced through normal operation and undesired mutual coupling make up the impedance $Z_{in}$, as is set forth in equation one herebelow:

$$Zin = Zantenna + Zsub + Z\,formation + Zt \qquad (1)$$

The transfer function for the antenna is represented in equation number two herebelow:

$$Rr + Zantenna + Zsub + Zformation + Zt = \frac{-Et}{I} \quad (2)$$

This transfer function states that the total current within the equivalent circuit of FIG. 15 is a function of the voltage of the transmitting antenna $E_t$, and all the impedances of the circuit of FIG. 15. The current can also be stated as a function of $E_{in}$ and $R_r$, as is set forth in equation number three herebelow:

$$I = \frac{-Ein}{Rr} \quad (3)$$

The transfer function for the antenna can be determined from these relationships in accordance with equation numbers four and five herebelow:

$$\text{Transfer Function} = \frac{Et}{Ein} = \quad (4)$$

$$\frac{Rr + Zantenna\ Zsub + Zinformation + Zt}{Rr}$$

Combining equation number two with equation number four yields equation number five:

$$\text{Transfer Function} = \frac{Et}{Ein} = \frac{Rr + Zin}{Rr} \quad (5)$$

Note that the transfer function is a simple function of the receiver impedance $R_r$ and the measured antenna input impedance $Z_{in}$.

In the present invention, the particular technique utilized to measure $Z_{in}$ is a conventional "network analysis method." In accordance with this technique, a reflection coefficient ρ is obtained by measuring the ratio of an incident wave to the reflected wave. Typically, a directional coupler or bridge is used to detect the reflected signal, and a network analyzer is used to supply and measure the signals. In the present invention, the numerically controlled oscillator can serve the functions of the network analyzer, since its output attributes (frequency, phase, and amplitude) can be precisely controlled, and further since the actual output is measured over a predetermined frequency interval. Directional couplers are devices which are used to separate or sample the traveling wave moving in one direction on a transmission line while remaining virtually unaffected by the traveling wave moving in the opposite direction. Thus, they are typically utilized in analyzing power transmission lines and the like. They are frequently used in combination with power splitters which receive an input, and provide two equal outputs. In the present invention, both directional couplers and power splitters are utilized to derive the measurements which are utilized in the elimination of the undesired effects of mutual coupling between receiving antennas.

The reflection coefficient is derived from the voltage of the signal reflected from the antenna and the voltage of the signal going into the antenna, in accordance with equation number six as follows:

$$\rho = \text{reflection coefficient} = (\text{voltage of signal reflected from antenna}) \div (\text{voltage of signal going into the antenna}) \quad (6)$$

Furthermore, the impedance of the antenna can be derived from the reflection coefficient and the impedance of the directional coupler $Z_o$ in accordance with equation number seven as is set forth herebelow:

$$Zin = \frac{(\rho + 1)}{(\rho - 1)} * Zo \quad (7)$$

Equation numbers five and seven can be combined to state $Z_{in}$ in terms of Rr (the impedance of the receiver circuit, which is known), Zo (the impedance of the directional coupler, which is also known), and ρ (the reflection coefficient, which an be calculated from a measurement of the incident signal and a measurement of the reflected signal) as follows in equation number eight:

$$Z_{in} = \frac{Rr + \frac{(\rho + 1)}{(\rho - 1)} * Zo}{Rr} \quad (8)$$

Figure 16:
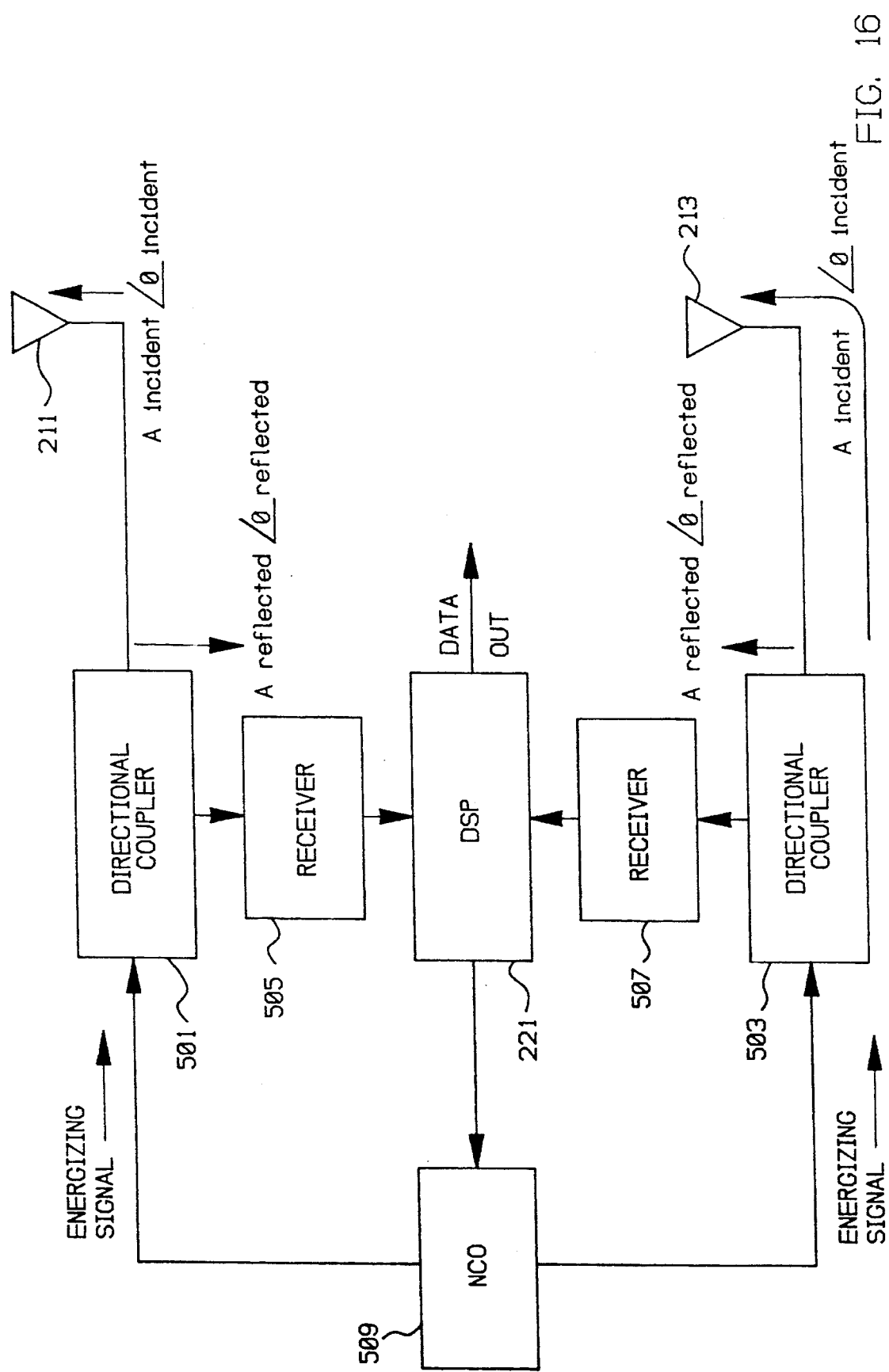
FIG. 16 is a block diagram of the technique for eliminating mutual coupling.
Figure 17:
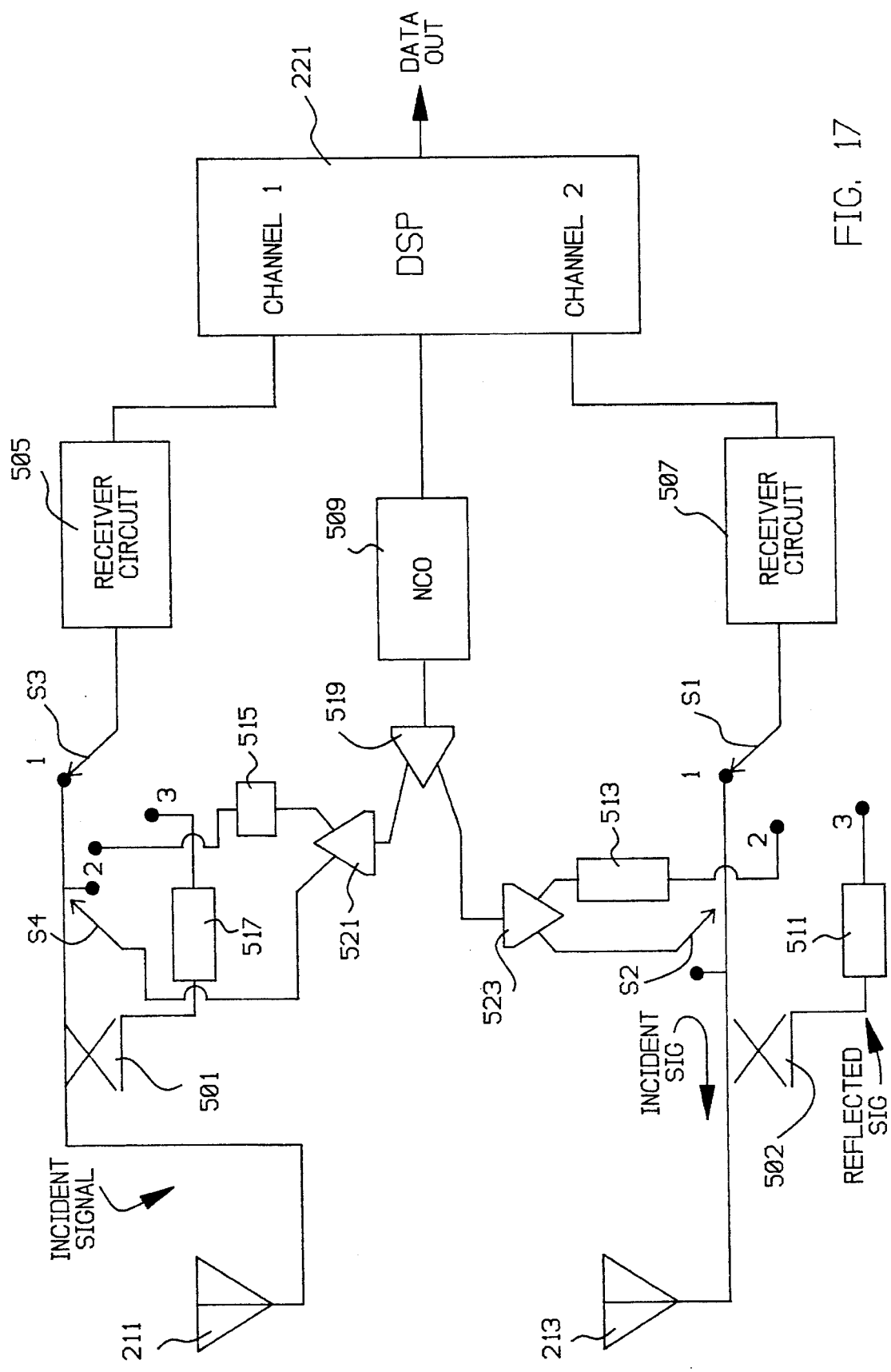
FIG. 17 is a detailed electrical schematic of the block diagram of FIG. 16.

FIG. 16 provides a block diagram view of the components which interact in the measurement process to eliminate the influence of undesired magnetic field mutual coupling between receiving antennas. FIG. 17 is a more detailed view of the components which cooperate together to make this analysis possible.

With reference first to FIG. 16, directional coupler 501, directional coupler 503, and numerically controlled oscillator 509 are especially provided to allow for the measurements which can be utilized to eliminate the effects of undesirable magnetic field mutual coupling between receiving antennas 211, 213. As will be described in connection with FIG. 17, directional couplers 501, 503 are switched in and out of the circuit depending upon whether normal reception operations are desired, or whether a mutual coupling calibration operation is required. Receiver circuits 505, 507 are identical to the receiver circuit depicted in FIG. 7 and described above. This receiver circuit has a characteristic resistance $R_r$ for receiver 505 and $R_r$ for receiver 507. These resistance values typically set to about 50 ohms as are the antenna input impedances Zin. Although the receiving antennas 211,213 are approximately set to 50 ohms variations with downhole conditions such as pressure and temperature occur. Digital signal processor 221 generates, or passes along, commands to numerically controlled oscillator 509 to provide an energizing signal which may be directed through either directional coupler 501 to receiving antenna 211, or through directional coupler 502 to receiving antenna 213. A certain portion of the energizing signal is accepted by receiving antenna 211 or 213, and a portion is reflected back, through directional coupler 501 to receiver 505, or through directional coupler 503 to receiver 507. The reflected signals are processed by digital signal processor 221, and passed to central processor 215. Digital signal processor 221 may simply provide a circular memory buffer for the storage of data, which is then periodically fetched by central processor 215 for further processing. This activity is represented by the "data out" bus of FIG. 16. In the preferred embodiment of the present invention, each of receiving antennas 211, 213 is analyzed separately.

In broad overview, in the present invention, the technique for correcting a measurement made with a particular receiving antenna for the (corrupting) error component due to undesirable magnetic field mutual coupling is accomplished by making the following measurements over a predefined frequency interval (such as 100 Hertz to 6 megahertz): direct an energizing signal to a particular receiving antenna, and measure with precision the amplitude and phase attributes of the incident wave; measure with precision the reflected wave which reflects off of the receiving antenna and back through a directional coupler; calculate the reflection coefficient ρ from the measurements of the incident wave and reflected wave; utilize the calculated value of reflection coefficient ρ, and the known impedance $Z_o$ of the directional coupler, to calculate the input impedance $Z_{in}$ for the particular receiving antenna; utilize $Z_{in}$ and the known (or fixed) impedance of the receiver circuit $R_r$ to calculate the transfer function for that particular antenna. Note that this determination is made for all operating frequencies of interest. With specific regard to the preferred embodiment of the present invention, measurements will need to be made for 400 kilohertz and for 2 megahertz, since these are the two operating frequencies are utilized during logging operations. Note that, in accordance with equation number five, the transfer function provides a measure of the ratio of the voltage generated in the receiving antenna as a consequence of an interrogating electromagnetic signal ($E_t$) and the voltage detected at the input of the reception circuit ($E_{in}$). In other words, the transfer function at a particular frequency equals $E_t \div E_{in}$. This transfer function may be applied to measurements made during logging operations to eliminate the influence of the corruption in the detected voltage ($E_{in}$) which is due to magnetic field mutual coupling and thermal (and other) drifts in antenna response. This correction may be accomplished by merely multiplying a detected signal ($E_{in}$) times the transfer function value for the receiving antenna at the interrogation frequency which is sensing the interrogating signal. In this manner, the measurement is corrected to supply an uncorrupted signal $E_t$ for further processing. In the preferred embodiment of the present invention, the mathematical operations which eliminate the corrupting influence of the undesirable magnetic field mutual coupling occur in either digital signal processor 221 or central processor 215.

In other words, for each measurement made by receiving antenna 211, digital signal processor 221 (or central processor 215) automatically fetches a value recorded in memory for the transfer function of receiving antenna 211 at the particular frequency of the interrogating signal which is being utilized. The measurement made utilizing receiving antenna 211 is multiplied by the transfer function value; the resulting product is a measurement value which is corrected for the corrupting influence of undesirable magnetic field mutual coupling between receiving antenna 211 and receiving antenna 213. Conversely, when receiving antenna 213 is utilized to measure an interrogating electromagnetic field, digital signal processor 221 (or central processor 215) fetches the transfer function value for the particular frequency of the interrogating field, and then multiples that value times the measurement obtained from receiving antenna 213. The product is the measurement made with receiving antenna 213 which has been corrected for the corrupting influence of undesirable magnetic field mutual coupling between receiving antenna 213 and receiving antenna 211. The details of operation are set forth below in the description in connection with FIG. 17.

With reference now to the view of FIG. 17, receiving antenna 211 is depicted as being optionally connected through directional coupler 501 to receiver circuit 505 and digital signal processor 221. Receiving antenna 213 is likewise depicted as being optionally coupled through directional coupler 503 to receiver circuit 507 and digital signal processor 221. Receiving antennas 211, 213 are optionally coupled to the output of numerically controlled oscillator 509 through power splitters 519, 521, and 523. Attenuators 511, 513, 515, and 517 are provided at selected positions within the circuit for load balancing and isolation purposes. Preferably, each attenuator provides a 60 dB of attenuation. In the circuit of FIG. 17, four switches are provided: switch S1, switch S2, switch S3, and switch S4. Each of these switches is under the control of digital signal processor 221 and/or central processor 215 (of FIG. 6). Switches S1, S3 are three-positioned switches, while switches S2, S4 are two-position switches. Each switch is under the binary control of a particular output pin of digital signal processor 221. Changes in the binary condition of the output pin of digital signal processor 221 will toggle switches S2, S4 between open and closed positions, while switches S1, S3 are toggled between the three positions.

FIG. 17 will now be utilized to describe six basic measurement operations which underlie and allow the technique of the present invention of eliminating the undesired effects of magnetic field mutual coupling between receiving antennas and phase drift due to high wellbore temperatures or pressures.

Step 1: in this step, switch S1 is set in position number two, switch S2 is closed, switch S3 is placed in position number one, and switch S4 is left open. Numerically-controlled oscillator 509 is coupled to receiving antenna 213 through switch S2 to allow an electromagnetic propagating wave to pass between receiving antenna 213 and receiving antenna 211. Also, in this particular configuration, receiver circuit 507 is connected to receive and monitor the output of numerically controlled oscillator 509 through power splitter 523 and attenuator 513 while receiving antenna 213 is energized. Additionally, receiving circuit 505 is connected to monitor the signal originating from receiving antenna 211 in response to the electromagnetic wave which travels from receiving antenna 213 to receiving antenna 211.

Step 2: this step is performed simultaneously with Step 1. Receiving circuit 505 is coupled through switch S3 through receiving antenna 211, and monitors the response of receiving antenna 211 to the electromagnetic propagating wave which is generated at receiving antenna 213 (which is operating as a transmitter) and received at receiving antenna 211 (which is operating as a receiver). In Step 2, all the switch positions are identical to those positions of Step 1.

The result of the simultaneous performance of these operations it that channel 1 of digital signal processor 221 records data from receiving antenna 211 through receiver circuit 505, while channel 2 of digital signal processor 221 records the output of numerically controlled oscillator 509 through receiver circuit 507. In the preferred embodiment of the present invention, numerically controlled oscillator 509 is commanded by digital signal processor 221 to step through a predetermined range of frequencies. The data accumulated on channel 1 and channel 2 of digital signal processor 221 thus defines two datasets: one which records the energizing signals supplied to receiving antenna 213 (the "incident signal"), which is operated as a transmitter, and a second which records the response of receiving antenna 211 to that energizing signal.

Figure 18A:
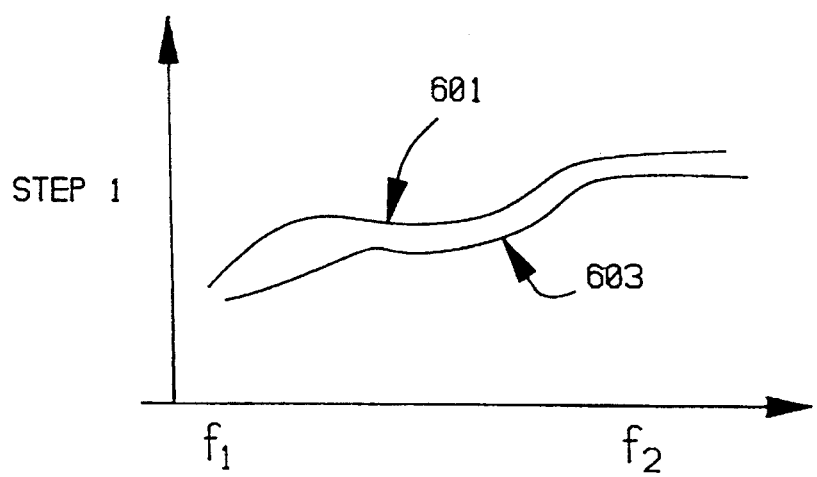
FIGS. 18A, 18B, 18C, 19A, 19B, and 19C depict types of measurements obtained with the circuit of FIG. 17.
Figure 18B:
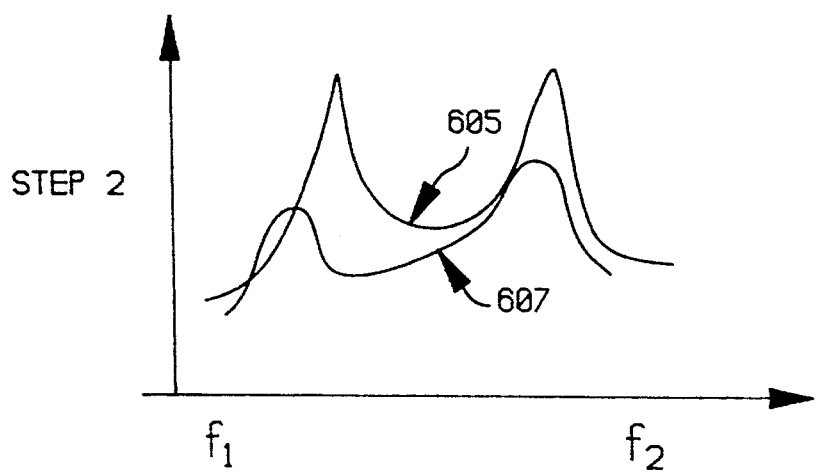

FIG. 18A provides a graphical depiction of data which is recorded on channel 2 of digital signal processor 221, with curve 601 providing a view of the amplitude of the output of the numerically controlled oscillator over the predefined frequency range of $f_1$ to $f_2$, and with curve 601 providing a record of the phase attributes of the output of the numerically controlled oscillator 509 for the range of frequencies from $f_1$ to $f_2$. Together, these values for amplitude and phase provide a measure of the "incident signal". FIG. 18B provides an exemplary view of the type of data which can be recorded on channel 1 of digital signal processor 221, with curve 605 representative of the amplitude response of receiving antenna 211 to the energizing electromagnetic wave provided by receiving antenna 213, over the predefined range of frequencies of $f_1$ to $f_2$, and with curve 607 providing information about the amplitude response of receiving antenna 211 over the same range of frequencies.

The information contained in FIG. 18B is similar to that contained in FIG. 12, but provides information about the operating condition of receiving antennas 211, 213. The type of data analysis which is discussed above in connection with FIGS. 12, 13A, 13B, and 13C can be performed upon the receiver-to-receiver profile. In other words, the signal recorded on channel 1 provides a measure of the combined response of receiving antenna 211 (operating as a transmitter) and receiving antenna 213 (operating as a receiver) in combination with the impact of the borehole and formation on the signal transmission. Data sets can be created for transmission in one direction (receiving antenna 213 operating as a transmitter, and receiving antenna 211 operating as a receiver) as well as the other direction (receiving antenna 211 operating as a transmitter, and receiving antenna 213 operating as a receiver). The data sets assembled for these operations can be compared with profiles developed in the laboratory for normal operation. Changes or shifts in resonant frequency, antenna Q, or the amplitude of response at a particular frequency can provide important information about whether the receiving antennas 211, 213 are operating as desired, or whether they are damaged or out of calibration.

Figure 18C:
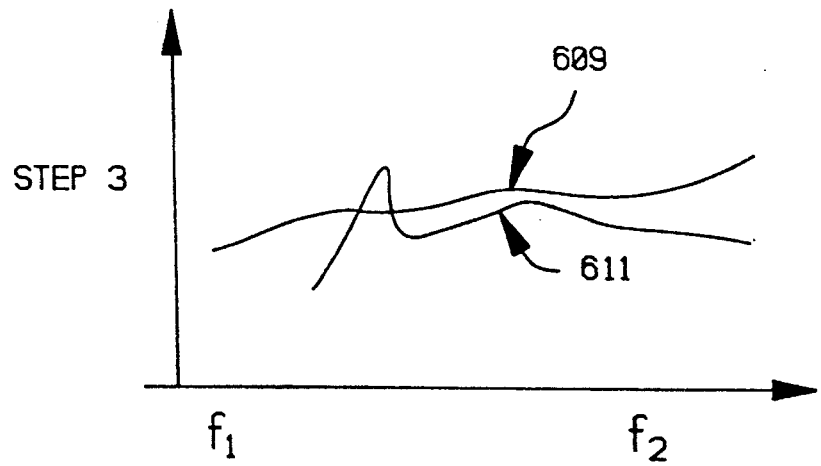

Step 3: in this step, switch 1 is set in position three, and switch 2 is closed. The positions of switch S3 and switch S4 are unimportant for this operation. In this operation, numerically controlled oscillator 509 directs an interrogating signal through power splitter 519, power splitter 523, and switch 3 toward directional coupler 503 and receiving antenna 213. A portion of the energizing signal is accepted by receiving antenna 213, and represents the "incident signal", while a portion is rejected by receiving antenna 213 and represents the "reflected signal." The reflected signal is directed through attenuator 511 and switch S1 to receiver circuit 507. Preferably, numerically controlled oscillator 509 is stepped through a predetermined frequency range, and receiver circuit 507 monitors the reflected signal over the particular frequency range, and ports the data into channel two of digital signal processor 221. FIG. 18C provides a graphic depiction of the type of data which is recorded in channel two of digital signal processor 52, with curve 609 representative of the amplitude attributes of the reflected signal and curve 611 representative of the phase attributes of the reflected signal.

In steps 4, 5, and 6, the process is reversed, with receiving antenna 211 serving as the transmitting antenna. This provides information from a different point of view.

Figure 19A:
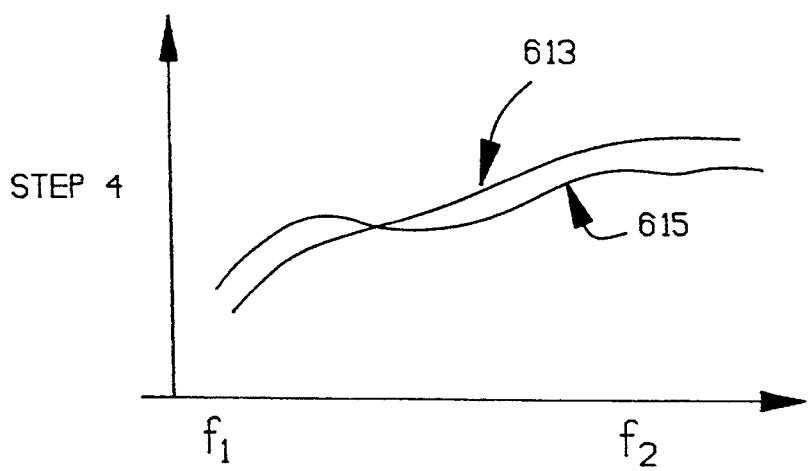

Step 4: in this step, switch S3 is set in position two, switch S4 is closed, switch S1 is set in position one, and switch S2 is left open. In this configuration, numerically controlled oscillator 509 may be stepped through a predefined frequency range, and receiver circuit 505 can record the amplitude and phase of the output of numerically controlled oscillator 509 (the "incident signal"), and provide this to channel one of digital signal processor 221. FIG. 19A provides a view of the type of amplitude 613 and phase 615 data which may be recorded during this operation.

Figure 19B:
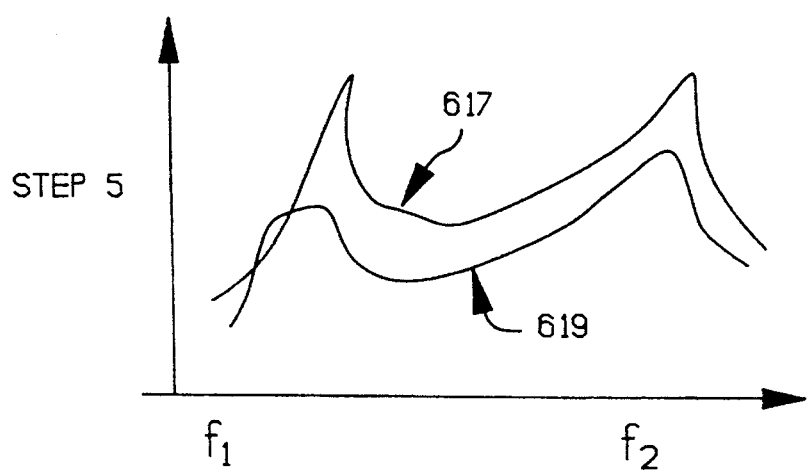

Step 5: This step is performed simultaneously with step 4. With the same particular switching configuration of Step 1, receiving antenna 211 is supplied with an energizing signal, causing an electromagnetic wave to propagate toward receiving antenna 213. Receiving antenna 213 responds to the propagating electromagnetic signal, and this response is monitored by receiver circuit 507 and recorded on channel two of digital signal processor 221. FIG. 19B graphically depicts the amplitude response curve 617 and the phase response curve 619, both over the predetermined frequency range.

Figure 19C:
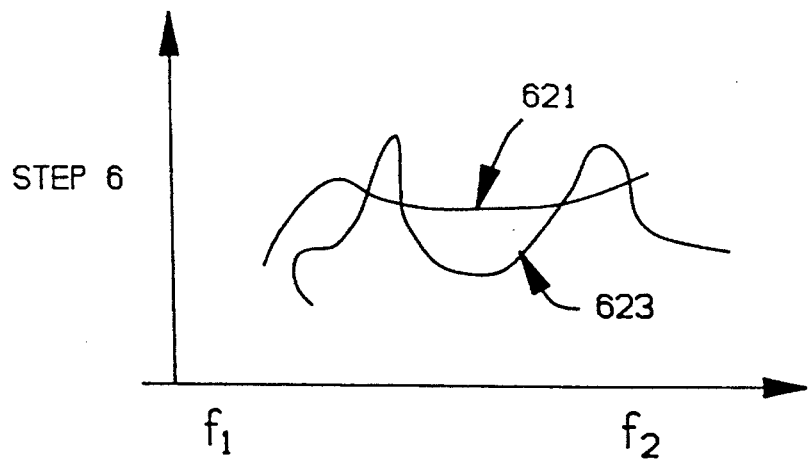

Step 6: in this step, switch S3 is set in position three, switch S4 is closed, switch S1 is set in position 1, and switch S2 is left open. In this particular switching configuration, the energizing signal provided by numerically controlled oscillator 509 is directed toward receiving antenna 211. A portion of the energizing signal is accepted by receiving antenna 211, and a portion is reflected. The reflected portion is routed through attenuator 517 and switch S3, where it monitored by receiver circuit 505, and recorded to channel one of digital signal processor 221. FIG. 19C provides a graphical depiction of the datasets which are maintained in channel one of digital signal processor 221 in graphic form.

In the preferred embodiment of the present invention, the data from these operations are arranged in data arrays, to allow for the use of conventional data manipulation operations in order to detect or identify particular attributes of the dataset, such as maximum responsiveness, minimum responsiveness, rates of change of the data, and the relative position of particular data attributes. Diagnostic operations can be performed utilizing these datasets. For example, the responses recorded in datasets corresponding to the information displayed in graphical form in FIGS. 18A and 19A may be compared. Since the numerically controlled oscillator 509 has "phase coherency," the amplitude and phase measurements of the datasets of FIGS. 18A and 19A should be identical. The failure to find similarity, or the discovery of dissimilarity, can serve to diagnose a variety of mechanical problems, including broken switches, a malfunctioning receiver, or other component failure. For an alternative example, the datasets which are visually represented in FIGS. 18B and 19B may be compared. The curves of FIGS. 18B and 19B should be identical, since they represent the combined response of the receiving antennas and the borehole region intermediate the receiving antennas.

Figure 20:
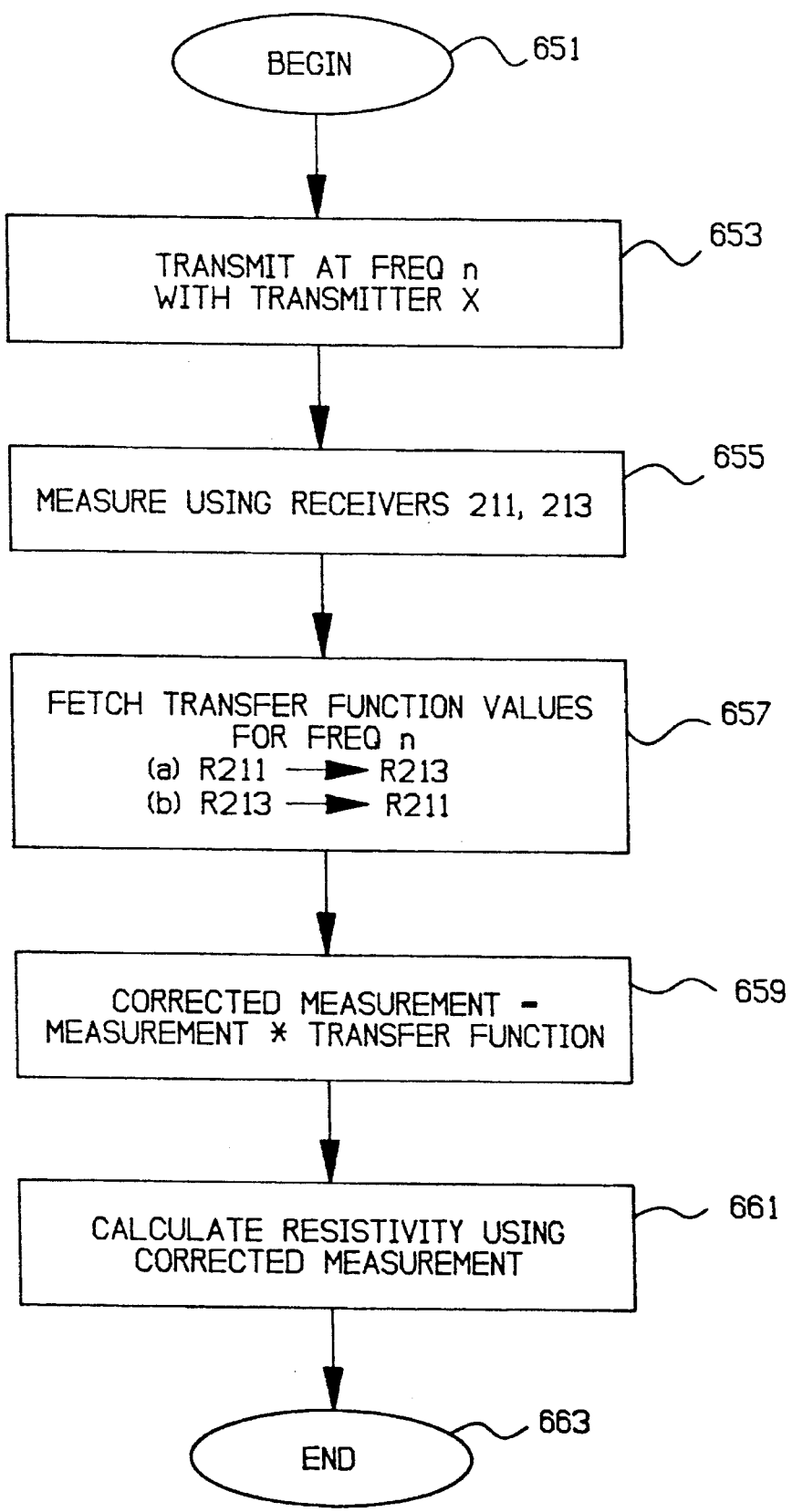
FIG. 20 is a flowchart representation of the technique of eliminating the corrupting influence of mutual coupling and antenna draft.

FIG. 20 is a flowchart depiction of the preferred technique of the present invention for correcting for the undesired corrupting influence of (1) magnetic field mutual coupling between receiving antennas, and (2) any drift in antenna response. The process begins at flowchart block 651. In block 653, a particular transmitter is energized with a current having a particular frequency to generate an electromagnetic field which propagates through the formation and borehole, and which is detected at receivers 211, 213, in accordance with software block 655. Then, in accordance with software block 657, digital signal processor 221 or central processor 215 fetch transfer function values for the particular operating frequencies for (a) the mutual coupling impact of receiving antenna 211 on receiving antenna 213, and (b) the mutual coupling impact of receiving antenna 213 on receiving antenna 211. Then, in accordance with software block 659, the transfer function value of the impact of receiving antenna 211 on receiving antenna 213 is applied to the measurements made with receiving antenna 213. Then, the transform value for the impact of receiving antenna 213 on receiving antenna 211 is applied to the measurements made with receiving antenna 211. Then, in accordance with software block 661, resistivity values for the formation are calculated using the corrected measurements, and the process ends at block 663. These operations are performed for every measurement made during logging operations. The transfer functions associated with transmission operation frequencies of 400 kilohertz are utilized to correct for mutual coupling and thermal error components present during 400 kilohertz logging operations, while the transfer functions associated with 2 megahertz are utilized to correct for the influence of mutual coupling and drift components during 2 megahertz transmission operations.

Figure 21:
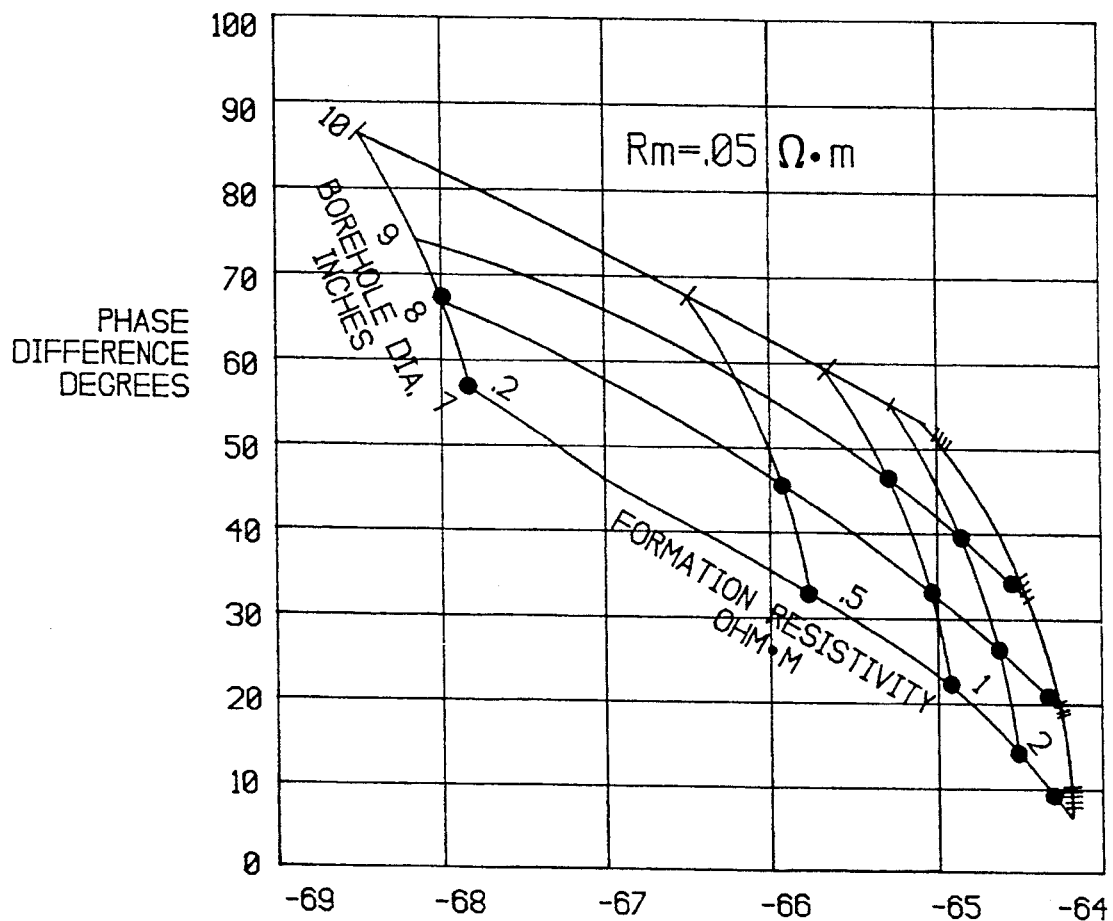
FIG. 21 is a graph which depicts how amplitude attenuation and phase shift measurements can be used to determine borehole diameter.

7. BOREHOLE CALIPER OPERATIONS: The ability to accurately calculate amplitude attenuation and phase shift, which are uninfluenced by mutual coupling and drift errors, allows for meaningful wellbore calipering operations. An accurate determination of the amplitude attenuation caused by the formation alone or the wave propagating between receiving antennas 211, 213, and an accurate measure of the phase difference between receiving antennas 211, 213, can be utilized with a library of graphs or data which are recorded in computer memory. FIG. 21 depicts a graph of phase difference in degrees versus attenuation in dB. With respect to these X- and Y-axes, a plurality of curves are provided. A plurality of curves are provided which correspond to borehole diameter, in inches. In FIG. 21, borehole diameters of 7", 8", 9", and 10" are graphed. A plurality of curves are provided which represent formation resistivity in ohm * meters. FIG. 21 depicts formation resistivity measurements of 0.2 ohm* meters, 0.5 ohm * meters, 1.0 ohm * meters, 2.0 ohm * meters, and 200 ohm * meters. This graph is accurate when the drilling mud has a resistivity of 0.05 ohm * meters ($R_m$). The graph of FIG. 21 is merely an exemplary graph. In practice, a plurality of graphs or datasets are provided for a plurality of mud resistivities $R_m$.

Provided that the formation resistivity and the mud resistivity $R_m$ are known, the amplitude attenuation and phase shift of the electromagnetic interrogating field can be utilized to determine the diameter of the borehole in the region of the logging apparatus. For example, with reference to FIG. 21, assuming that the formation resistivity is 0.5 ohm * meters and the mud resistivity $R_m$ is 0.05 ohm * meters, a calculated amplitude attenuation of −66 dB and a phase difference of 55° indicates that the borehole has a diameter of approximately 9". In accordance with the present invention, central processor 215 and digital signal processor 221 can be programmed to periodically or intermittently calculate borehole diameter, and transmit it to the surface utilizing mud pulse telemetry techniques. If the borehole diameter is enlarged to 10", this should be reflected by changes in the amplitude attenuation and phase shift. In contrast, if the borehole narrows in diameter to 8", this would also be reflected in the amplitude attenuation and phase shift measurements. Borehole calipering operations can only be conducted if uncorrupted measurements of amplitude attenuation and phase shift can be obtained. Since the present invention allows for the correction of any corrupting influence of magnetic mutual coupling, or thermal and other types of drift, such measurements can be utilized to accurately determine borehole diameter. In the preferred embodiment of the present invention, a plurality of data sets are provided, each corresponding to a different mud resistivity $R_m$, and a particular formation resistivity. The measurements of amplitude attenuation and phase shift are then utilized to determine borehole diameter.

8. LOGGING CALCULATIONS: The following discussion illustrates how the dual transmitter, dual receiver measurement-while-drilling apparatus of the present invention is utilized to derive an accurate measure of the amplitude attenuation and phase shift of the interrogating electromagnetic signal which travels through the borehole and surrounding formation.

First, consider four transmitter-to-receiver signals:
(Transmitter 1 [X1] to Receiver 1 [R1]): $A_{11} e^{i\Phi 11}$
(Transmitter 1 [X1] to Receiver 2 [R2]): $A_{12} e^{i\phi 12}$
(Transmitter 2 [X2] to Receiver 1 [R1]): $A_{21} e^{i\Phi 21}$
(Transmitter 2 [X2] to Receiver 2 [R2]): $A_{22} e^{i\Phi 22}$ The measured amplitudes are made up of:

$$A_{mn}=X_m R_n a_{tmn} \quad\text{(Eq., 1.1)}$$

where $X_m$=transmitter output variation
$R_n$=receiver sensitivity variation
atmn=true amplitude (transmitter M to receiver N);
and the measured phases are made up of:

$$\Phi_{mn}=\Phi_{Xm}+\Phi_{Rn}+\Phi_{tmn} \quad\text{(Eq. 1.2)}$$

where
$\Phi Xm$=transmitter phase (output) variation
$\Phi_{RN}$=receiver phase variation
$\Phi_{tmn}$=true phase (transmitter M to receiver N)

The foregoing general equations correspond to the following more specific equations:

$$A_{11}=X_1 R_1 a_{t11}$$

$$A_{12}=X_1 R_2 a_{t12}$$

$$A_{21}=X_2 R_1 a_{t21}$$

$$A_{22}=X_2 R_2 a_{t22}$$

$$\Phi_{11}=\Phi_{X1}+\Phi_{R1}+\Phi_{t11}$$

$$\Phi_{12}=\Phi_{X1}+\Phi_{R2}+\Phi_{t12}$$

$$\Phi_{21}=\Phi_{X2}+\Phi_{R1}+\Phi_{t21}$$

$$\Phi_{22}=\Phi_{X2}+\Phi_{R2}+\Phi_{t22}$$

Taking ration of the various transmitter-to-receiver signals produces the following:
For Transmitter 1:

$$\frac{A_{12} e^{i\phi 12}}{A_{11} e^{i\phi 11}} = \frac{A^{12}}{A_{11}} e^{i(\phi 12-\phi 11)}$$

and for Transmitter 2:

$$\frac{A_{21} e^{i\phi 21}}{A_{22} e^{i\phi 22}} = \frac{A^{21}}{A_{22}} e^{i(\phi 21-\phi 22)} *$$

Multiplying these and taking the square root gives equation $$\sqrt{\frac{A_{12}}{A_{11}} * e^{i(\phi 12-\phi 11)} * \frac{A_{21}}{A_{22}} * e^{i(\phi 21-\phi 22)}}$$

$$\sqrt{\frac{A_{12}*A_{21}}{A_{11}*A_{22}}} \; e^{i1/2(\phi 12+\phi 21-\phi 11-\phi 22)}$$

Straightforward algebraic manipulation of Eqs. 1.1 through 1.3 yields:

$$\sqrt{\frac{a_{t12}*a_{t21}}{a_{t11}*a_{t22}}} * e^{i1/2(\phi t12+\phi t21-\phi t11-\phi t22)}$$

because all the system variables drop out of the measurement.

Therefore, by using two transmitters and two receivers, systematic variables can be removed from both the attenuation (amplitude) and from the phase velocity (phase difference) terms.

Within the context of the preferred embodiment of this invention, in which a sampled-data processing means produces a signal as a function of formation resistivity based on phase-representing signals, the following analysis demonstrates certain matter relevant to the stability feature.

Consider two consecutive samples: Sample A and Sample B.

During Sample A, a first transmitting coil is energized to cause a wave to propagate through the formation in a direction such that the wave passes a first receiving coil (R1), and later passes a second receiving coil (R2), and induces each receiver coil to produce a signal.

During Sample B, a second transmitting coil is energized to cause a wave to propagate through the formation in a direction such that the wave passes a second receiving coil (R2), and later passes the first receiving coil (R1), and induces each receiver coil to produce a signal.

Let $\Phi MR2A$ represent the measured phase of the signal produced by receiver coil R2 during Sample A; let $\Phi MR1A$ represent the measured phase of the signal produced by receiver coil R1 during Sample A; let $\Phi MR1B$ represent the measured phase of the signal produced by receiver coil R1 during Sample B; and let $\Phi MR2B$ represent the measured phase of the signal produced by receiver coil R2 during Sample B.

The $\Phi MR2A$ signal depends on the phase of the wave at the location of R2, and in general, has an error component attributable to various phase shifts including those introduced by the tuned receiver coil, cabling from the receiver coil to the receiver, and the receiver itself. Let $\Phi TR2A$ represent the true phase of the wave at the location or R2 during Sample A, and let $\Phi R2E$ represent the error component so introduced.

$$\Phi MR2A = \Phi TR2A + \Phi R2E \quad \text{(Eq. 2.1)}$$

Similarly, the $\Phi MR1A$ signal depends on the phase of the wave at the location or R1, and in general, has its own error component. Let $\Phi TR1A$ represent the true phase of the wave at the location of R1 during Sample A, and let $\Phi R1E$ represent the error component so introduced.

$$\Phi MR1A = \Phi TR1A + \Phi R1E \quad \text{(Eq. 2.2)}$$

During Sample A, the $\Phi MR1A$ signal and the $\Phi MR2A$ are simultaneously processed to produce a DeltaA signal that represents the difference in phase between these two signals (i.e., $\Phi MR1a - \Phi MR2A$).

$$\text{Delta A} = (\Phi TR2A - \Phi TR1A) + (\Phi R2E - \Phi R1E) \quad \text{(Eq. 2.3)}$$

The component of the DeltaA signal representing the true phase difference ($\Phi TR2A - \Phi TR1A$) is a function of the resistivity of the formation in the region between the two receiver coils. Let F(rho) represent this component.

$$\text{DeltaA} = F(rho) + (\Phi R2E - \Phi R1E) \quad \text{(Eq. 2.4)}$$

Similarly, during Sample B, the $\Phi MR2B$ signal and the $\Phi MR1B$ are simultaneously processed to produce a DeltaB signal that represents the difference in phase between these two signals (i.e., $\Phi MR2B - MR1B$).

$$\Phi MR1B = \Phi TR1B + \Phi R1E \quad \text{(Eq. 2.5)}$$

$$\Phi MR2B = \Phi TR2B + \Phi R2E \quad \text{(Eq. 2.6)}$$

$$\text{DeltaB} = (\Phi TR1B - \Phi TR2B) + (\Phi R1E - \Phi R2E) \quad \text{(Eq. 2.7)}$$

The component of the DeltaB signal representing the true phase difference ($\Phi TR1B - \Phi TR2B$) is a function of the resistivity of the formation in the region between the two receiver coils; i.e., it equals f(rho).

$$\text{DeltaB} = f(rho) + (\Phi R1E - \Phi R2E) \quad \text{(Eq. 2.8)}$$

The Delta A signal is recorded so that it can be retrieved and processed with the Delta B signal.

By adding Equations 2.7 and 2.8, it follows that:

$$\text{DeltaA} + \text{DeltaB} = 2 * f(rho) + \Phi R2E - \Phi R1E - \Phi R2E + \Phi R1E \text{ and}$$

$$f(rho) = \tfrac{1}{2} * (\text{DeltaA} + \text{DeltaB}) \quad \text{(Eq. 2.9)}$$

In other words, a computed signal representing the sum of the consecutive samples is a function of formation resistivity, and error components such as $\Phi R1E$ and $\Phi R2E$ do not introduce errors into this computed signal.

While the invention has been shown in only one of its forms, it is not thus limited but is susceptible to various changes and modifications without departing from the spirit thereof.

What is claimed is:

1. A logging apparatus for use in interrogating a borehole and surrounding formation, comprising:

a housing;

at least one transmitter antenna carried by said housing;

at least one receiver antenna carried by said housing;

at least one oscillator, which is electrically coupled to said at least one transmitter antenna for selectively energizing said at least one transmitter antenna, which has at least one digital input and an analog output, and which provides a particular analog output from a plurality of available analog outputs at least in part in response to receipt of a particular digital command signal;

a controller means for (1) supplying a particular digital command signal from a plurality of available digital command signals in response to program instructions, (2) causing said analog output of said at least one oscillator to be applied to a particular ones of said at least one transmitter antenna to produce an interrogating electromagnetic field, (3) utilizing said at least one receiver antenna to measure at least one attribute of said interrogating electromagnetic field, and (4) calculating a value for at least one attribute of at least one of said borehole and surrounding formation.

2. A logging apparatus according to claim 1:

wherein said at least one oscillator provides an analog signal at said analog output with a frequency attribute which is determined at least in part by said digital command signal at said at least one digital input.

3. A logging apparatus according to claim 2:

wherein said at least one oscillator provides an analog signal at said analog output with a phase attribute which is determined at least in part by said digital command signal at said at least one digital input.

4. A logging apparatus according to claim 2:

wherein said at least one oscillator provides an analog signal at said analog output with an amplitude attribute which is determined at least in part by said digital command signal at said at least one digital input.

5. A logging apparatus according to claim 1:

wherein said controller means utilizes a combination of (a) measurements of said at least one attribute of said interrogating electromagnetic field, and (b) said particular analog output, to calculate said value for said at least one attribute of at least one of said borehole and surrounding formation.

6. A logging apparatus according to claim 1:

wherein said controller means utilizes a combination of (a) measurements of a phase attribute of said interrogating electromagnetic field, and (b) phase of said particular analog output, to calculate said value for said at least one attribute of at least one of said borehole and surrounding formation.

7. A logging apparatus according to claim 1:

wherein said controller means utilizes a combination of (a) measurements of an amplitude attribute of said interrogating electromagnetic field, and (b) amplitude of said particular analog output, to calculate said value for said at least one attribute of at least one of said borehole and surrounding formation.

8. A logging apparatus according to claim 1:

wherein said at least one oscillator comprises an oscillator for each of said at least one transmitter antenna, which is located proximate thereto.

9. A method of interrogating a borehole and surrounding formation, comprising the method steps of:

providing a housing;

providing at least one transmitter antenna carried by said housing;

providing at least one receiver antenna carried by said housing;

providing at least one oscillator, which is electrically coupled to said at least one transmitter antenna for selectively energizing said at least one transmitter antenna, which has at least one digital input and an analog output, and which provides a particular analog output from a plurality of available analog outputs at least in part in response to receipt of a particular digital command signal;

supplying a particular digital command signal from a plurality of available digital command signals to said at least one digital input of said at least one oscillator;

causing said analog output of said at least one oscillator to be applied to a particular ones of said at least one transmitter antenna to produce an interrogating electromagnetic field;

utilizing said at least one receiver antenna to measure at least one attribute of said interrogating electromagnetic field;

calculating a value for at least one attribute of at least one of said borehole and surrounding formation.

10. A method of interrogating a borehole and surrounding formation according to claim 9, further comprising:

utilizing said at least one oscillator to provide an analog signal at said analog output with a frequency attribute which is determined at least in part by said digital command signal at said at least one digital input.

11. A method of interrogating a borehole and surrounding formation according to claim 9, further comprising:

utilizing said at least one oscillator to provide an analog signal at said analog output with a phase attribute which is determined at least in part by said digital command signal at said at least one digital input.

12. A method of interrogating a borehole and surrounding formation according to claim 9, further comprising:

utilizing said at least one oscillator to provide an analog signal at said analog output with a amplitude attribute which is determined at least in part by said digital command signal at said at least one digital input.

13. A method of interrogating a borehole and surrounding formation according to claim 9:

wherein said step of calculating comprises a combination of (a) measurements of said at least one attribute of said interrogating electromagnetic field, and (b) said particular analog output, to calculate said value for said at least one attribute of at least one of said borehole and surrounding formation.

14. A method of interrogating a borehole and surrounding formation according to claim 9:

wherein said step of calculating comprises utilizing a combination of (a) measurements of a phase attribute of said interrogating electromagnetic field, and (b) phase of said particular analog output, to calculate said value for said at least one attribute of at least one of said borehole and surrounding formation.

15. A method of interrogating a borehole and surrounding formation according to claim 9:

wherein said step of calculating comprises utilizing a combination of (a) measurements of an amplitude attribute of said interrogating electromagnetic field, and (b) amplitude of said particular analog output, to calculate said value for said at least one attribute of at least one of said borehole and surrounding formation.

16. A logging apparatus for use in interrogating a borehole and surrounding formation, comprising:

a housing;

at least one transmitter antenna carried by said housing;

at least one receiver antenna carried by said housing;

at least one oscillator, which is electrically coupled to said at least one transmitter antenna for selectively energizing said at least one transmitter antenna, which has at least one digital input and an analog output, and which provides an analog output at a particular frequency which is determined at least in part by a digital signal provided at said at least one digital input;

at least one controller which is electrically coupled to said at least one oscillator through said at least one digital input and which is electrically coupled to said at least one receiver antenna;

said at least one controller being operable in a plurality of modes of operation, including:

(1) a transmission mode of operation, wherein said at least one controller provides a particular digital command signal to said at least one digital input in response to program instructions, to produce an analog signal from said analog output of said at least one oscillator having a particular frequency which is associated with said particular command signal, for energizing said at least one transmitter to initiate propagation of an interrogating electromagnetic field through said borehole and surrounding formation; and (2) a reception mode of operation, wherein said at least one controller samples measurements of at least one attribute of said interrogating electromagnetic field made utilizing said at least one receiver antenna.

17. A logging apparatus according to claim 16:

wherein said at least one oscillator provides an analog signal at said analog output with a predetermined phase attribute which is determined at least in part by said digital signal provided at said at least one digital input.

18. A logging apparatus according to claim 17:

wherein said controller member is operable in the following additional mode of operation:

(3) an analysis mode of operation wherein said at least one controller calculates a value for an attribute of at least one of said borehole and said surrounding formation utilizing said sampled measurements.

19. A logging apparatus according to claim 17:

wherein said at least one receiver antenna comprises at least two receiver antennas;

wherein said controller member is operable in the following additional modes of operation:

(3) an analysis mode of operation, wherein said at least one controller calculates a value for an attribute of at least one of said borehole and said surrounding formation utilizing sampled measurements taken from said at least two receiver antennas.

20. A logging apparatus according to claim 17:
wherein said controller member is operable in the following additional mode of operation:
(3) an analysis mode of operation wherein said at least one controller calculates a value for an attribute of at least one of said borehole and surrounding formation utilizing sampled measurements taken from a single one of said at least one receiver antenna and said predetermined phase attribute which is determined at least in part by said digital signal provided at said at least one digital input.

21. A logging apparatus according to claim 16:
wherein said at least one oscillator provides an analog signal at said analog output with a predetermined amplitude which is determined at least in part by said digital signal provided at said at least one digital input.

22. A logging apparatus according to claim 17:
wherein said controller member is operable in the following additional mode of operation:
(3) an analysis mode of operation wherein said at least one controller calculates a value for an attribute of at least one of said borehole and surrounding formation utilizing sampled measurements taken from a single one of said at least one receiver antenna and said predetermined amplitude attribute which is determined at least in part by said digital signal provided at said at least one digital input.

23. A logging apparatus according to claim 16:
wherein said at least one controller comprises:
a transmission controller for each particular one of said at least one transmitter antenna for providing a particular digital command signal to said at least one digital input of a particular one of said at least one oscillator assembled with said each particular one of said at least one transmitter in response to digital commands originating from a central processor.

24. A logging apparatus according to claim 23, further comprising:
a reception controller for continuously sampling said at least one attribute of said interrogating electromagnetic field and for providing measurements to said central processor in response to a digital command.

25. A logging apparatus according to claim 24, wherein said measurements comprise an average of continuously sampling by said reception controller of said at least one attribute of said interrogation electromagnetic field.

26. A logging apparatus according to claim 16:
wherein said housing comprises a tubular conduit adapted for coupling in a selected position within a drillstring in said borehole during drilling operations.

27. A logging apparatus according to claim 16:
wherein said at least one transmitter antenna comprises a plurality of transmitter antennas;
wherein said at least one receiver antenna comprises a plurality of receiver antennas; and
wherein, during said transmission mode of operation, said at least one controller selects particular ones of said plurality of transmitter antennas and said plurality of receiver antennas for inclusion in said transmission mode of operation, thereby selecting a particular transmission path from a plurality of available transmission paths.

28. An apparatus for logging a borehole and surrounding formation, comprising:

a housing;
at least one transmitter antenna carried by said housing;
at least one receiver antenna carried by said housing;
an energizing circuit coupled to said at least one transmitter antenna for selectively supplying an energizing alternating current to said at least one transmitter antenna of a particular frequency corresponding to a particular supplied command signal, which produces an interrogating electromagnetic field having said particular frequency;
a reception circuit for utilizing said at least one receiver antenna in measuring at least one attribute of said interrogating electromagnetic field; and
a controller member for (a) supplying a plurality of particular command signals to produce a plurality of interrogating electromagnetic fields of differing frequencies in a predetermined order, and (b) sampling measurements made by said reception circuit.

29. An apparatus for logging a borehole and surrounding formation according to claim 28, wherein said housing is adapted for coupling in a selected position within a drillstring, and includes a central bore for passing drilling fluids.

30. An apparatus for logging a borehole and surrounding formation according to claim 28:
wherein said at least one transmitter antenna comprises an upper transmitter antenna, and a lower transmitter antenna; and
wherein said at least one receiver antenna comprises a plurality of intermediate receiver antennas.

31. An apparatus for logging a borehole and surrounding formation according to claim 28, wherein said controller member comprises:
a controller member operable in an interrogation mode of operation for (a) supplying a plurality of particular command signals to produce a plurality of interrogating electromagnetic fields of differing frequencies in a predetermined order, (b) sampling measurements made by said reception circuit, and (c) calculating at least one of the following attributes of said borehole and surrounding formation utilizing said measurements made by said reception circuit:
(1) amplitude attenuation of said plurality of interrogating electromagnetic fields; and
(2) phase shift of said plurality of interrogating electromagnetic fields.

32. An apparatus for logging a borehole and surrounding formation according to claim 31, wherein said attributes of said borehole and surrounding formation provide a measure of formation resistivity.

33. An apparatus for logging a borehole and surrounding formation according to claim 31:
wherein said energizing circuit includes an oscillator member which provides as an output an oscillating signal having a frequency determined at least in part by a digital input.

34. An apparatus for logging a borehole and surrounding formation according to claim 33, wherein said digital input comprises at least one of:
(a) a digital clock input;
(b) a digital command provided by said controller member; and
(c) the contents of one or more digital registers.

35. An apparatus for logging a borehole and surrounding formation according to claim 28, wherein said controller member is operable in a plurality of modes including:

a calibration mode of operation, wherein said controller member (a) supplies a plurality of particular command signals to produce a plurality of interrogating electromagnetic fields of differing frequencies over a predetermined range of frequencies, (b) samples measurements made by said reception circuit, and (c) compares at least one antenna transform attribute to a predetermined measure of an antenna transform attribute.

36. An apparatus for logging a borehole and surrounding formation according to claim 35:

wherein said antenna transform attribute comprises at least one of:
(a) a resonant frequency for said at least one receiving antenna;
(b) an antenna Q for said at least one receiver antenna;
(c) phase shift for said at least one receiver antenna;
(d) signal amplitude for said at least one receiver antenna.

37. An apparatus for logging a borehole and surrounding formation according to claim 35, wherein, during said calibration mode of operation, said controller member supplies a plurality of sequential command signals to energize a particular one of said at least one transmitter antenna through said energizing circuit, to sweep through a predefined frequency range.

38. An apparatus for logging a borehole and surrounding formation according to claim 35, wherein, during said calibration mode of operation, at least one of frequency response and phase shift over a particular predefined frequency range are monitored.

39. An apparatus for logging a borehole and surrounding formation according to claim 35, wherein, during said calibration mode of operation, a transform amplitude is monitored.

40. An apparatus for logging a borehole and surrounding formation according to claim 35, wherein said reception circuit includes a digital signal processor positioned intermediate said at least one receiver antenna and said controller member.

41. An apparatus for logging a borehole and surrounding formation according to claim 40, wherein said digital signal processor provides two data channels, one for each of said receiver antenna.

42. An apparatus for logging a borehole and surrounding formation according to claim 40, wherein said digital signal processor generates an average of data samples, providing a low-pass filter to enhance stability of said at least one receiver antenna.

43. An apparatus for logging a wellbore and surrounding formation, comprising:

a plurality of transmitter antennas carried by said housing;

a plurality of receiver antennas carried by said housing;

wherein said plurality of transmitter antennas and said plurality of receiver antennas are located at particular positions relative to said housing and one another in accordance with a predetermined antenna configuration;

an energizing circuit coupled to said plurality of transmitter antennas for supplying an alternating current having a particular frequency to a particular one of said plurality of transmitter antennas in response to a particular command signal;

wherein said particular one of said plurality of transmitter antennas is energized by said alternating current to provide an interrogating electromagnetic field having a frequency corresponding to said particular frequency of said alternating current, for passing through said wellbore and surrounding formation, and for detection by said plurality of receiver antennas;

a processing circuit coupled to said energizing circuit for:
(1) executing program instructions contained in memory during a calibration mode of operation to supply at least one command signal to said energizing circuit to cause said particular one of said plurality of transmitter antennas to be energized successively by a plurality of differing alternating currents, each having a different frequency;
(2) executing program instructions contained in memory during said calibration mode of operation to sample interrogating electromagnetic signals associated with said plurality of differing alternating currents with at least one of said plurality of receiver antennas; and
(3) executing program instructions to compare data derived from sampling with at least one preestablished antenna performance criterion.

44. An apparatus for logging a wellbore and surrounding formation according to claim 43, wherein said housing couples in drillstring and includes central bore for passing drilling fluids.

45. An apparatus for logging a borehole and surrounding formation according to claim 43, wherein said housing is adapted for coupling in a selected position within a drillstring, and includes a central bore for passing drilling fluids.

46. An apparatus for logging a borehole and surrounding formation according to claim 43, wherein said at least one transmitter antenna comprises an upper transmitter antenna, and a lower transmitter antenna;

wherein said at least one receiver antenna comprises a plurality of intermediate receiver antennas.

47. An apparatus for logging a borehole and surrounding formation according to claim 43, wherein said controller member comprises:

a controller member for (a) supplying a plurality of particular command signals to produce a plurality of interrogating electromagnetic fields of differing frequencies in a predetermined order, (b) sampling measurements made by said reception circuit, and (c) calculating at least one of the following attributes of said borehole and surrounding formation utilizing said measurements made by said reception circuit:
(1) amplitude attenuation of said plurality of interrogating electromagnetic fields;
(2) phase shift of said plurality of interrogating electromagnetic fields.

48. An apparatus for logging a borehole and surrounding formation according to claim 47, wherein said attributes of said borehole and surrounding formation comprise a measure of formation resistivity.

49. An apparatus for logging a borehole and surrounding formation according to claim 43:

wherein said energizing circuit includes an oscillator member which provides as an output an oscillating signal having a frequency determined at least in part by a digital input.

50. An apparatus for logging a borehole and surrounding formation according to claim 49, wherein said digital input comprises at least one of:
(a) a digital clock input;
(b) a digital command provided by said controller member; and
(c) the contents of one or more digital registers.

51. An apparatus for logging a borehole and surrounding formation according to claim 43, wherein said controller member is operable in a plurality of modes including:

a calibration mode of operation, wherein said controller member (a) supplies a plurality of particular command signals to produce a plurality of interrogating electromagnetic fields of differing frequencies over a predetermined range of frequencies, (b) sampled measurements made by said reception circuit, and (c) comparing at least one antenna transform attribute to a predetermined measure of antenna transform attribute.

52. An apparatus for logging a borehole and surrounding formation according to claim 51:

wherein said antenna transform attribute comprises at least one of:
(a) a resonant frequency for said at least one receiving antenna;
(b) an antenna Q for said at least one receiver antenna;
(c) phase shift for said at least one receiver antenna;
(d) signal amplitude for said at least one receiver antenna.

53. An apparatus for logging a borehole and surrounding formation according to claim 43, wherein, during said calibration mode of operation, said controller member supplies a plurality of sequential command signals to energize a particular one of said at least one transmitter antenna through said energizing circuit, to sweep through a predefined frequency range.

54. An apparatus for logging a borehole and surrounding formation according to claim 43, wherein, during said calibration mode of operation, at least one of frequency response and phase shift over a particular predefined frequency range are monitored.

55. An apparatus for logging a borehole and surrounding formation according to claim 43, wherein, during said calibration mode of operation, a transform amplitude is monitored.

56. An apparatus for logging a borehole and surrounding formation according to claim 43, wherein said reception circuit includes a digital signal processor positioned intermediate said at least one receiver antenna and said controller member.

57. An apparatus for logging a borehole and surrounding formation according to claim 55, wherein said digital signal processor provides two data channels, one for each of said receiver antenna.

58. An apparatus for logging a borehole and surrounding formation according to claim 57, wherein said digital signal processor generates an average of data samples, providing a low-pass filter to enhance stability of said at least one receiver antenna.

* * * * *